(12) United States Patent
Xu et al.

(10) Patent No.: US 10,973,036 B2
(45) Date of Patent: *Apr. 6, 2021

(54) ELECTRONIC DEVICE AND WIRELESS COMMUNICATION METHOD IN WIRELESS COMMUNICATION SYSTEM

(71) Applicant: Sony Corporation, Tokyo (JP)

(72) Inventors: Xiaodong Xu, Beijing (CN); Weiyang Lin, Beijing (CN); Chengcheng Yang, Beijing (CN); Nannan Chen, Beijing (CN); Xiaojia Song, Beijing (CN)

(73) Assignee: SONY CORPORATION, Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 16/693,380

(22) Filed: Nov. 25, 2019

(65) Prior Publication Data

US 2020/0092897 A1   Mar. 19, 2020

Related U.S. Application Data

(63) Continuation of application No. 15/303,162, filed as application No. PCT/CN2015/078192 on May 4, 2015, now Pat. No. 10,517,108.

(30) Foreign Application Priority Data

May 14, 2014   (CN) .......................... 201410203757.0

(51) Int. Cl.
*H04W 72/12*   (2009.01)
*H04W 64/00*   (2009.01)
(Continued)

(52) U.S. Cl.
CPC ...... *H04W 72/1215* (2013.01); *H04B 7/0632* (2013.01); *H04L 5/005* (2013.01);
(Continued)

(58) Field of Classification Search
CPC . H04W 72/1215; H04W 48/04; H04W 48/06; H04W 48/18; H04W 76/10;
(Continued)

(56) References Cited

U.S. PATENT DOCUMENTS 9,628,057 B2     4/2017   Shuvalov et al.
9,743,390 B2 *   8/2017   Heo ...................... H04L 1/1864
(Continued)

FOREIGN PATENT DOCUMENTS

CN   103108405 A   4/2014
CN   103702346 A   4/2014

OTHER PUBLICATIONS

International Search Report dated Jul. 8, 2015 in PCT/CN2015/078192 filed May 4, 2015.

*Primary Examiner* — Redentor Pasia
(74) *Attorney, Agent, or Firm* — Xsensus, LLP

(57) ABSTRACT

An electronic device and a wireless communication method in a wireless communication system. The electronic device includes circuitry configured to: set configuration information for D2D communication measurement for a first UE served by the electronic device, wherein the configuration information contains reference signal information about a second UE of a candidate object with which the first UE conducts D2D communication; send the configuration information, to trigger communication link quality measurement between the first UE and the second UE; receive a measurement report from the first UE; determine whether to convert the communication between the first UE and a current communication object to a communication with the second UE based on the measurement report; and send conversion information when the conversion determination unit determines to convert the communication, to notify the first UE and the UE to conduct communication.

20 Claims, 9 Drawing Sheets

(51) Int. Cl.

| | |
|---|---|
| *H04W 8/00* | (2009.01) |
| *H04L 25/02* | (2006.01) |
| *H04W 72/08* | (2009.01) |
| *H04W 76/14* | (2018.01) |
| *H04W 4/80* | (2018.01) |
| *H04W 4/70* | (2018.01) |
| *H04W 4/00* | (2018.01) |
| *H04B 7/06* | (2006.01) |
| *H04L 5/00* | (2006.01) |
| *H04W 48/16* | (2009.01) |
| *H04W 72/04* | (2009.01) |
| *H04W 76/27* | (2018.01) |
| *H04W 4/02* | (2018.01) |
| *H04L 12/801* | (2013.01) |
| *H04W 84/04* | (2009.01) |
| *H04W 88/06* | (2009.01) |
| *H04W 88/08* | (2009.01) |

(52) U.S. Cl.
CPC ......... *H04L 25/0224* (2013.01); *H04W 4/00* (2013.01); *H04W 4/70* (2018.02); *H04W 4/80* (2018.02); *H04W 8/005* (2013.01); *H04W 64/00* (2013.01); *H04W 64/006* (2013.01); *H04W 72/085* (2013.01); *H04W 76/14* (2018.02); *H04L 5/006* (2013.01); *H04L 5/0051* (2013.01); *H04L 47/29* (2013.01); *H04W 4/023* (2013.01); *H04W 4/027* (2013.01); *H04W 48/16* (2013.01); *H04W 72/0486* (2013.01); *H04W 76/27* (2018.02); *H04W 84/042* (2013.01); *H04W 88/06* (2013.01); *H04W 88/08* (2013.01)

(58) Field of Classification Search
CPC ..... H04W 76/14; H04W 76/15; H04W 76/20; H04L 47/29; H04L 25/0224
See application file for complete search history.

(56) References Cited

U.S. PATENT DOCUMENTS

| | | | |
|---|---|---|---|
| 9,826,562 B2 | 11/2017 | Morita | |
| 9,838,863 B2 | 12/2017 | Lindoff et al. | |
| 10,237,852 B2* | 3/2019 | Jung | H04W 76/14 |
| 10,517,108 B2* | 12/2019 | Xu | H04W 8/005 |
| 2012/0184306 A1 | 7/2012 | Zou et al. | |
| 2013/0265974 A1 | 10/2013 | Van et al. | |
| 2014/0071950 A1 | 3/2014 | Jang et al. | |
| 2014/0213221 A1 | 7/2014 | Chai | |
| 2015/0215767 A1* | 7/2015 | Siomina | H04W 76/14 |
| | | | 455/435.2 |
| 2015/0215984 A1 | 7/2015 | Schmidt et al. | |
| 2015/0230284 A1 | 8/2015 | Nimbalker et al. | |
| 2015/0271859 A1 | 9/2015 | Huang et al. | |
| 2015/0312836 A1 | 10/2015 | Fukuta | |
| 2015/0327201 A1* | 11/2015 | He | H04W 48/16 |
| | | | 370/336 |
| 2015/0327241 A1 | 11/2015 | Van et al. | |
| 2015/0334757 A1 | 11/2015 | Seo | |
| 2015/0341773 A1* | 11/2015 | Ribeiro | H04L 47/27 |
| | | | 370/329 |
| 2016/0066209 A1* | 3/2016 | Lin | H04W 36/0083 |
| | | | 370/230 |
| 2016/0323868 A1 | 11/2016 | Kalhan et al. | |
| 2017/0332427 A1 | 11/2017 | Yamazaki et al. | |
| 2017/0374700 A1 | 12/2017 | Sharma | |
| 2018/0338256 A1* | 11/2018 | Fodor | H04W 76/14 |

* cited by examiner

ELECTRONIC DEVICE AND WIRELESS COMMUNICATION METHOD IN WIRELESS COMMUNICATION SYSTEM

CROSS-REFERENCE TO RELATED APPLICATIONS

The present application is a continuation of U.S. application Ser. No. 15/303,162, filed Oct. 10, 2016, which is based on PCT filing PCT/CN2015/078192, filed May 4, 2015, which claims priority to CN 201410203757.0, filed May 14, 2014, the entire contents of each are incorporated herein by reference.

FIELD

The present disclosure relates to the technical field of wireless communication, and in particular to an electronic equipment and a wireless communication method in a wireless communication system.

BACKGROUND

This part provides the background related to the present disclosure, but is not necessarily the conventional technology.

In an existing wireless communication system, a centralized control mode is generally adopted. That is, an evolution Node Base Station (eNB) controls a communication behavior of a User Equipment (UE). In this case, the eNB needs to allocate wireless resource overhead to each UE. However, with the rapid development of the wireless communication technology, the number of UEs, service quantities and the like are increasing and being close to a carrying upper limit of the existing wireless communication system. At present, as a key wireless communication technology of the next generation of cellular communication, a Device-to Device (D2D) communication technology; can bring a great performance gain to the communication system, for example, having advantages of improving a frequency spectrum usage rage, reducing a power loss of a user terminal and the like, thereby being concerned by the standardization work and academic research.

A mechanism of establishing the D2D communication generally concerned by current research is approximately as follows. In an RRC-IDLE state and an RRC-CONNECTED state, if it is detected by a base station that a UE and another communication object UE meet a D2D communication condition, such as a short distance between the UEs, the base station notifies the UEs to initiate a D2D terminal discovery and detection. When the UE is connected to the target UE successfully, it indicates that the D2D communication is established successfully, and then the D2D communication is performed.

However, an issue caused by the above process is that, the base station determines whether the UE can perform the D2D communication only based on detection on the base station side, and thus a detection condition of the base station is often instantaneous and unilateral. For a main communication body UE, the detection condition on the base station side can not effectively certify that the UE can perform and maintain an effective D2D communication.

SUMMARY

This part provides a general summary of the present disclosure, instead of an entire range of the present disclosure or a complete disclosure of all features of the present disclosure.

It is an object of the present disclosure to provide an electronic equipment and a wireless communication method in a wireless communication system, for performing and maintaining an effective D2D communication between user equipments in view of measurements performed by the user equipments.

In an aspect of the present disclosure, an electronic equipment in a wireless communication system is provided. The electronic equipment includes: a setting unit configured to set, for a first user equipment served by the electronic equipment, configuration information for a Device-to-Device (D2D) communication measurement, where the configuration information contains information on a reference signal of a second user equipment being a candidate object for a D2D communication of the first user equipment; a first transmitting unit configured to transmit the configuration information, to trigger a communication link quality measurement between the first and second user equipments; a receiving unit configured to receive a measurement report from the first user equipment; a switching determination unit configured to determine, based on the measurement report, whether a communication object of the first user equipment is to be switched from a current communication object to the second user equipment; and a second transmitting unit configured to transmit switching information to notify the first and second user equipments to communicate with each other, if it is determined by the switching determination unit that the communication object of the first user equipment is to be switched from the current communication object to the second user equipment.

In another aspect of the present disclosure, an electronic equipment in a wireless communication system is provided. The electronic equipment includes: a receiving unit configured to receive configuration information for a Device-to-Device (D2D) communication measurement and switching information for indicating switching of a communication object, transmitted by a base station equipment serving the electronic equipment, where the configuration information contains information on a reference signal of a user equipment being a candidate object for a D2D communication of the electronic equipment; a configuring unit configured to perform a configuration on the electronic equipment based on the configuration information, to perform a communication link quality measurement; a measuring unit configured to perform a measurement on the quality of a communication link between the electronic equipment and the user equipment based on the configuration performed by the configuring unit and the reference signal of the user equipment received by the receiving unit; a transmitting unit configured to transmit a measurement report to the base station equipment based on the measurement result of the measuring unit; and a switching unit configured to switch a communication object of the electronic equipment from a current communication object to the user equipment based on the switching information.

In another aspect of the present disclosure, an electronic equipment in a wireless communication system is provided. The electronic equipment includes: a receiving unit configured to receive configuration information on physical resource of a Device-to-Device (D2D) reference signal for a D2D measurement, from a base station equipment serving the electronic equipment; a configuring unit configured to perform a D2D reference signal transmission configuration on the electronic equipment based on the configuration information; and a transmitting unit configured to transmit the D2D reference signal based on the configuration performed by the configuring unit, the D2D reference signal including at least one of a Sounding Reference Signal (SRS) and a Demodulation Reference Signal (DMRS).

In another aspect of the present disclosure, a wireless communication method in a wireless communication system is provided. The method includes: setting, by an electronic equipment in the wireless communication system, for a first user equipment served by the electronic equipment, configuration information for a Device-to-Device (D2D) communication measurement, the configuration information containing information on a reference signal of a second user equipment being a candidate object for a D2D communication of the first user equipment; transmitting the configuration information, to trigger a communication link quality measurement between the first and second user equipments; receiving a measurement report from the first user equipment; determining, based on the measurement report, whether a communication object of the first user equipment is to be switched from a current communication object to the second user equipment; and transmitting switching information to notify the first and second user equipments to communicates with each other, if it is determined that the communication object of the first user equipment is to be switched from the current communication object to the second user equipment.

In another aspect of the present disclosure, a wireless communication method in a wireless communication system is provided. The method includes: receiving, by an electronic equipment in the wireless communication system, configuration information for a Device-to-Device (D2D) communication measurement and switching information for indicating a switching of a communication object, transmitted by a base station equipment serving the electronic equipment, the configuration information containing information on a reference signal of a user equipment being a candidate object for a D2D communication of the electronic equipment; perforating a configuration on the electronic equipment based on the configuration information, to perform a communication link quality measurement; receiving the reference signal of the user equipment based on the configuration, to perform a communication link quality measurement between the electronic equipment and the user equipment; transmitting a measurement report to the base station equipment based on the measurement result; and switching a communication object of the electronic equipment from a current communication object to the user equipment based on the switching information.

In another aspect of the present disclosure, a wireless communication method in a wireless communication system is provided. The method includes: receiving, by an electronic equipment in the wireless communication system, configuration information on physical resource of a Device-to-Device (D2D) reference signal for a D2D measurement from a base station equipment serving the electronic equipment; performing a D2D reference signal transmission configuration on the electronic equipment based on the configuration information; and transmitting the D2D reference signal based on the configuration, with the D2D reference signal including at least one of a Sounding Reference Signal (SRS) and a Demodulation Reference Signal (DMRS).

With the electronic equipment and the wireless communication method in the wireless communication system, the base station can notify a user equipment to perform a measurement. By receiving the measurement report transmitted by the user equipment, the base station can make a transmission mode switching decision corresponding to the measurement report. In this case, it is ensured that a transmission mode switching decision made by the base station in a special scenario is effective and targeted, and an effective D2D communication is performed and maintained between the user equipments.

In the description herein, a further adaptability region becomes apparent. The description and specified examples in the summary are only for illustrative objects, but are not intend to limit the scope of the present disclosure.

BRIEF DESCRIPTION OF THE DRAWINGS

The drawings described herein are only for illustrating preferred embodiments instead of all possible embodiments, and are not intended to limit the scope of the present disclosure. In the drawings.

Figure 1:
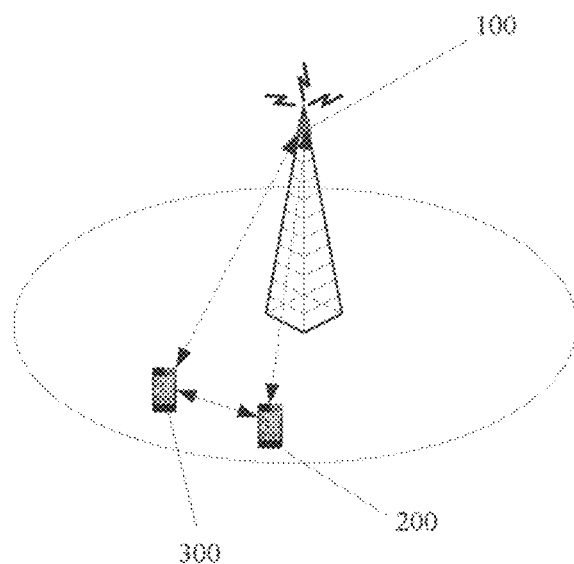
FIG. 1 is a schematic diagram illustrating a normal scenario in which a communication mode switching is performed in a wireless communication system.

Although the present disclosure is prone to be modified and replaced, specified embodiments thereof have been shown in the drawings as examples and are described in detail. However, it should be understood that, the descriptions of the specified embodiments herein are not intended to limit the present disclosure to the disclosed forms. And reversely, the object of the present disclosure is to cover all modifications, equivalents and replacements falling within the spirit and scope of the present disclosure. It should be noted that, corresponding reference numerals indicate corresponding parts throughout the drawings.

DETAILED DESCRIPTION OF EMBODIMENTS

In the following, examples of the present disclosure are described in detail with reference to the drawings. The descriptions below are substantially illustrative and are not intended to limit the application or use of the present disclosure.

Exemplary embodiments are provided, to make the present disclosure thorough and fully convey the scope of the present disclosure to those skilled in the art. Numerous specific details, such as examples of specific parts, devices and methods, are set forth in order to provide a thorough understanding of the present disclosure. It is apparent to those skilled in the art that, the exemplary embodiments may be implemented in many different forms without the specific details, and hence all of them should not be construed as limiting the scope of the present disclosure. In some exemplary embodiments, processes, structures and technologies, which are well known, are not described in detail.

The present disclosure relates to a Device-to-Device (D2D) communication in a wireless communication system. A User Equipment (UE) according to the present disclosure includes but is not limited to a terminal with a wireless communication function, such as a mobile terminal, a computer and an in-vehicle device.

FIG. 1 illustrates a normal scenario in which a communication mode switching is performed in a wireless communication system. The wireless communication system illustrated in FIG. 1 includes a base station equipment 100, a UE 200 and a UE 300. The UE 200 performs a wireless communication with the base station equipment 100, and performs a wireless communication with the UE 200 in a traditional cellular communication mode via the base station equipment 100.

In a case that the UE 200 and its communication object, i.e. the UE 300, meet a basic feature for a D2D communication, that is, the UE 200 is adjacent to the UE 300, the communication anode between the UE 200 and the UE 300 may be switched from the traditional cellular communication mode to a D2D commutation mode.

As mentioned in the above background part, if the base station equipment 100 determines whether the UE 200 and the UE 300 can perform the D2D communication only based on detection on the base station side, a detection condition is often instantaneous and unilateral. For example, in a case that the UE 200 and the UE 300 which are performing the traditional cellular communication are in a moving state, channel states between the UE 200 and the UE 300 become more complicate as compared with channel states corresponding to a static state. Therefore, only based on a distance between the UE 200 and the UE 300 determined by the base station 100 at a certain time instant, it is difficult to ensure that the UE 200 and the UE 300 keep meeting the D2D communication condition for a long time after the determination. In this case, the D2D condition may be no longer met and may be invalid due to changes in channel and distance, if the UE 200 and the UE 300 start to perform an inter-D2D terminal discovery and detection. Therefore, to effectively establish and maintain a D2D communication between the UE 200 and the UE 300, not only the base station needs to acquire more information, but also the UE needs to acquire effective information by itself.

The present disclosure provides an electronic equipment and a wireless communication method in a wireless communication system, to at least partially address the above issue.

According to embodiments of the present disclosure, in order to avoid difficulties in establishing or maintaining a D2D communication process caused by mobility and the like, a base station may pre-determine a specified scenario and perform a D2D measurement process based on the determination accordingly, thereby obtaining a more reasonable determination. It should be noted that, the technical solution of the present disclosure is aimed at UEs being in a traditional cellular communication, that is, the pair of communicating UEs are in a traditional RRC connected state.

A process of the technical solution according to the present disclosure is generally as follows. Firstly, in a case that a UE and its communication object (i.e. another UE) meet a basic feature for a D2D communication, that is, adjacent to each other, a base station acquires information such as a velocity of the UE and an adjacent cell deployment density from the UE, an adjacent cell and a network side, to determine the specific current scenario.

Next, in different scenarios, the base station transmits configuration information to the UE and its communication object (called as target UE hereinafter). That is to say, the target UE is notified to transmit a reference signal and the UE (called as slave UE hereinafter) performs a measurement based on the configuration information transmitted by the base station. In a case that a triggering condition for a D2D event is met, a measurement report is transmitted to the base station by the slave UE. In the present disclosure, the target UE is one of two UEs being in a communication, which transmits a reference signal in a D2D measurement process. In addition, the slave UE is one of the two UEs being in the communication, which measures the reference signal transmitted by the target UE and transmits a measurement report to the a source servicing cell base station of the slave UE in the D2D measurement process. It should be noted that, with measurement pre-configured signaling of the base station, the UEs are configured as the target UE and the slave UE. In the following, the measurement pre-configured signaling of the base station is described in detail.

After this, the base station makes a collective decision based on the scenario and the measurement report transmitted by the slave UE. In a case that the UEs meet the condition for establishing a D2D communication and can maintain the D2D communication for a long time, the base station transmits a switching notify to the UEs to switch the transmission mode between the UEs from the traditional cellular communication mode to the D2D communication mode.

It should be noted that, in a case that a direct connected data link exists between the UEs, it is considered that the UEs have entered into a D2D transmission mode. In this case, whether a link (data link and control link) exists between a UE and the network side depends on a specific scenario.

Besides, the technical solution according to the present disclosure can be further applied in a scenario in which a measurement value of the quality of a D2D communication link between the slave UE and the target UE is less than a predetermined threshold. For example, in a case that the measurement value of the quality of the D2D communication link between the slave UE and the target UE is less than the predetermined threshold, the base station, for example, may transmit configuration information to the slave UE and its candidate communication object such as a third UE, that is, notifies the third UE to transmit a reference signal. And the slave UE performs a measurement based on the configuration information transmitted by the base station. If the triggering condition for the D2D event is met, the slave UE transmits a corresponding measurement report to the base station.

After that, the base station makes a decision based on the measurement report transmitted by the slave UE. In a case that the measurement report indicates that the quality of a D2D communication link between the slave UE and the third UE is better than the quality of the D2D communication link between the slave UE and the target UE, it is determined by the base station that the D2D communication mode between the slave UE and the target UE is switched to the D2D communication mode between the slave UE and the third UE.

Figure 2:
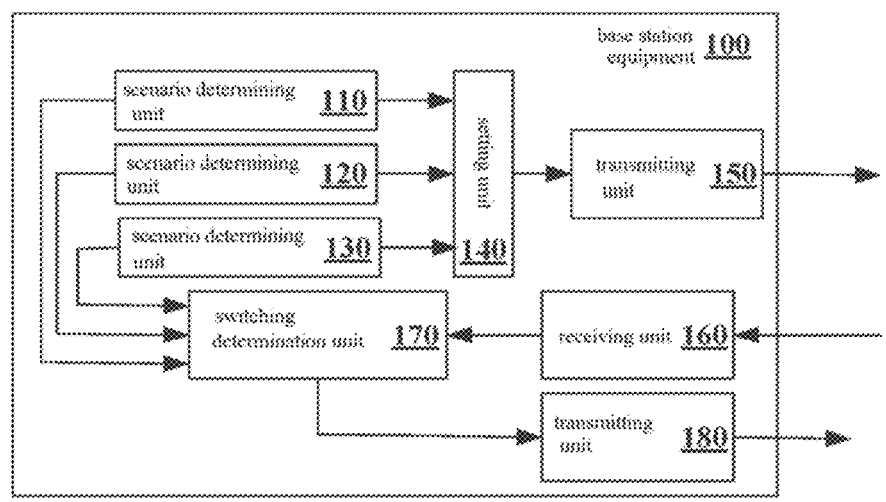
FIG. 2 is a block diagram illustrating a structure of a base station equipment according to an embodiment of the present disclosure.

FIG. 2 illustrates a structure of the base station 100 according to an embodiment of the present disclosure. As illustrated in FIG. 1, the base station 100 may include a setting unit 140, a transmitting unit 150, a receiving unit 160, a switching determination unit 170 and a transmitting unit 180.

The setting unit 140 may set, for a first UE served by the base station equipment 100, configuration information for a D2D communication measurement. Here, the configuration information may include information on a reference signal of a second UE which is a candidate object of a D2D communication of the first UE. According to a preferred embodiment of the present disclosure, the information on the reference signal of the second UE may include information on physical resource carrying the reference signal. Further, according to a preferred embodiment of the present disclosure, the reference signal may be at least one of a Sounding Reference Signal (SRS) and a Demodulation Reference Signal (DMRS).

The transmitting unit 150 may transmit configuration information to trigger a communication link quality measurement between the first UE and the second UE. According to a preferred embodiment of the present disclosure, the transmitting unit 150 may further transmit configuration information for indicating physical resource utilized by the second UE to transmit the reference signal. It should be noted that, such indication may be an indirect indication across base stations, which is not limited herein. In addition, according to a preferred embodiment of the present disclosure, the transmitting unit 150 may package the configuration information into radio resource control (RRC) signaling to transmit the configuration information to the first UE. In addition, the pre-configuration for the first UE may be also contained in RRCconnectionreconfiguration signaling, which is not limited herein.

The receiving unit 160 may receive a measurement report from the first UE.

The switching determination unit 170 may determine whether a communication object of the first UE is to be switched from a current communication object to the second UE based on the measurement report. Here, the current communication object of the first UE may be the base station equipment 100 or another UE.

In a case that it is determined by the switching determination unit 170 that the communication between the first UE and the current communication object (including a traditional communication between the first UE and the base station equipment 100 and a current D2D communication) is to be switched to the communication between the first UE and the second UE, the transmitting unit 180 may transmit switching information to notify the first UE and the second UE to communicate with each other.

According to an embodiment of the present disclosure, the base station equipment 100 may notify the UE to perform a measurement accordingly. By receiving the measurement report transmitted by the UE, the base station equipment 100 may make a transmission mode switching decision corresponding to the measurement report. In this case, it is ensured that the transmission mode switching decision in a special scenario made by the base station equipment 100 is effective and targeted, thereby establishing and maintaining an effective D2D communication between UEs.

In the following, the technical solution according to the present disclosure is described in further detail with reference to the drawings.

As illustrated in FIG. 2, the base station equipment 100 may further include a scenario determining unit 110. The scenario determining unit 100 may be configured to determine whether the first UE (the UE 200 as illustrated in FIG. 1) is in a first scenario. In the first scenario, a system gain may be improved if the first UE performs a D2D communication with the second UE (the UE 300 as illustrated in FIG. 1).

If it is determined by the scenario determining unit 110 that the first UE is in the first scenario, the setting unit 140 may set configuration information for configuring the first UE and the second UE, thereby facilitating a latter communication link quality measurement.

Next, the transmitting unit 150 may transmit the configuration information to trigger the communication link quality measurement between the first UE and the second UE.

Next, the receiving unit 160 may receive a measurement report from the first UE.

Based on the first scenario and the measurement report, the switching determination unit 170 may determine whether a communication mode between the first UE and the second UE is to be switched from the traditional cellular communication mode to a D2D communication mode.

If it is determined by the switching determination unit 170 that the communication mode is to be switched from the traditional cellular communication mode to the D2D communication mode, the transmitting unit 180 may transmits switching information to notify the first UE and the second UE to perform a communication mode switching.

Figure 3:
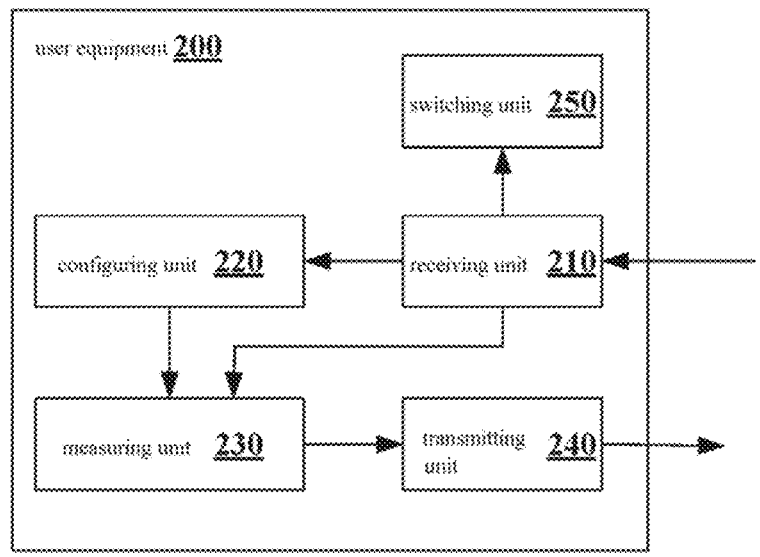
FIG. 3 is a block diagram illustrating a structure of a user equipment according to an embodiment of the present disclosure.

FIG. 3 illustrates a structure of the UE 200 according to an embodiment of the present disclosure. As illustrated in FIG. 3, the UE 200 may include a receiving unit 210, a configuring unit 220, a measuring unit 230, a transmitting unit 240 and a switching unit 250.

The receiving unit 210 may receive configuration information for a D2D communication measurement and switching information for indicating a communication object switching, transmitted by a base station equipment serving the UE 200. Here, the configuration information may include information on a reference signal of a UE being a candidate object of a D2D communication of the UE 200. As mentioned in the above, the information on the reference signal of the candidate UE may include information on physical resource carrying the reference signal. The configuration information may be packaged in RRC signaling and transmitted to the UE 200. And the reference signal may be at least one of a Sounding Reference Signal (SRS) and a Demodulation Reference Signal (DMRS).

The configuring unit 220 may configure the UE 200, based on the configuration information, to perform a communication link quality measurement.

Based on the configuration performed by the configuring unit 220 and the reference signal of the candidate UE received by the receiving unit 210, the measuring unit 230 may measure the quality of a communication link between the UE 200 and the candidate UE.

Based on the measurement result of the measuring unit 230, the transmitting unit 240 may transmit a measurement report to the receiving unit 160 of the base station equipment 100. According to a preferred embodiment of the present disclosure, the measuring unit 230 may measure and compare the qualities of links between the UE 200 and other communication objects, and the transmitting unit 240 may transmit the measurement report based on the comparison result.

Based on the switching information, the switching unit 250 may switch a communication between the UE 200 and a current communication object to a communication between the UE 200 and the candidate UE. Similarly, the current communication object may be the base station or another UE.

Figure 4:
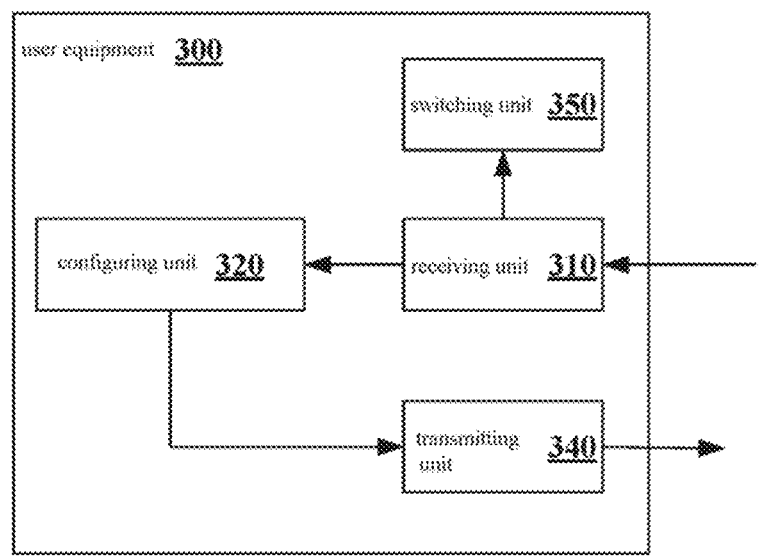
FIG. 4 is a block diagram illustrating a structure of a user equipment according to an embodiment of the present disclosure.

FIG. 4 illustrates a structure of the UE 300 according to an embodiment of the present disclosure. As illustrated in FIG. 4, the UE 300 may include a receiving unit 310, a configuring unit 320 and a transmitting unit 340.

The receiving unit 310 may receive configuration information on physical resource of a D2D reference signal for a D2D measurement, from a base station equipment serving the UE 300.

The configuring unit 320 may perform a D2D reference signal transmission configuration on the UE 300 based on the configuration information.

The transmitting unit 340 may transmit a D2D reference signal based on the configuration performed by the configuring unit 320. Here, the D2D reference signal may include at least one of a Sounding Reference Signal (SRS) and a Demodulation Reference Signal (DMRS).

As illustrated in FIG. 4, the UE 300 may further include a switching unit 350. Based on switching information, the switching unit 350 may switch a communication mode between the UE 300 and anther UE (the UE 200 as shown in FIG. 1) from a traditional cellular communication mode to a D2D communication mode.

According to an embodiment of the present disclosure, if it is detected by the base station equipment 100 that a UE meets a certain D2D communication condition, the base station equipment 100 notifies the UE to perform a measurement accordingly. By receiving the measurement report transmitted by the UE and based on a scenario, the base station 100 may make a transmission mode switching decision accordingly. In this case, it can be ensured that the transmission mode switching decision in a special mode made by the base station equipment 100 is effective and targeted, thereby performing and maintaining an effective D2D communication between the UEs.

In the following, factors for determining a first scenario (also referred to as a D2D communication suitable scenario) are described in detail.

If it is detected by a source base station such as the base station equipment 100 that a scenario that a UE is in is suitable for a D2D communication (in this case, the quality of a traditional link between the UE and the base station may not be reduced while a system gain is improved, by performing the D2D communication), the source base station triggers the UE to perform a related measurement as a slave UE.

Factors related to the D2D communication suitable scenario mainly include a UE moving state, an adjacent deployment density, a UE service requirement quantity, a source serving cell load degree and the like. The base station may consider the above factors by combining the factors in a certain manner and in a priority order, to decide different measurement scenarios for the UE, and to trigger the UE to perform measurement processes corresponding to the measurement scenarios.

In other words, the scenario determining unit 110 can determine whether the UE is in the first scenario, based on at least one of information on the UE moving state, information on the UE service requirement, information on adjacent cell deployment density and information on the source cell load degree.

Specially, researches on acquisitions of the above information have been made widely and deeply in the conventional technologies. Substantially effective acquisition methods are as shown in Table 1.

TABLE 1

Factors affecting a transmission mode switching decision of a base station

| Serial number | Factors | Acquisition approaches | Approximate methods |
|---|---|---|---|
| 1 | UE moving state | By signaling interaction between eNB and UE | GPS, MSE |
| 2 | Adjacent cell deployment density | By signaling interaction between eNB and UE, adjacent cell and network side | Adjacent cell list, counter |
| 3 | UE service requirement | By signaling interaction between eNB and UE | Service requirement report |
| 4 | Source cell load degree | By Source base station | Source base station self-known |

In the above table 1, eNB indicates an evolution Node Base Station, GPS indicates a Global Positioning System, and MSE indicates a Mobility state estimation.

In the following, the four factors in the table 1 are described in detail

1. UE Moving State

In the traditional communication mode, the mobility state of UE is one of main reasons of a handover. An overhigh mobility slate may cause frequent handovers and an overhigh handover failure possibility. Especially, for example, if UEs in a high-velocity train want to communicate with each other, the number of link switching may be reduced by establishing a D2D communication, thereby improving a system gain.

In the present disclosure, a velocity of a UE may be described as an absolute velocity and a relative velocity based on different references, as shown in table 2. A transmission mode switching scenario suitable for a UE may be estimated based on the velocity of the UE.

TABLE 2

UE velocity analysis

| Velocity name | Reference | Classification | Example |
|---|---|---|---|
| Absolute velocity | Base station | High velocity >60 km/h | High-velocity train |
| | | Moderate velocity between 3~60 km/h | General service tools |
| | | Low velocity <3 km/h | Walking |
| Relative velocity | Target UE | High velocity >3 km/h | Non-walking |
| | | Low velocity <3 km/h | Walking |

In an example of the present disclosure, whether a UE is adapted to a D2D communication is determined based on relative velocity in a case of a low relative velocity between UEs, it can be ensured that the UEs unlikely move beyond a maximum D2D effective distance in a certain communication period of time to damage a D2D communication link. In another example of the present disclosure, whether a UE is to perform a D2D communication may be further determined based on an absolute velocity between the UE and a base station. In addition, whether a transmission mode of the UE is to be switched is determined by the base station based on other conditions, for example, determining a switching scenario and making a decision corresponding to the scenario. For example, a transmission mode switching scenario, in which the relative velocity between UEs is low and the absolute velocity between the UE and the base station is high, is determined by the base station as a transmission mode switching scenario under a high-velocity moving state, such as a high-velocity train scenario. In a case that the absolute velocity between the UE and the base station is a moderate velocity, since it is possible to trigger the UE to hand over to an adjacent cell, the source base station may further determine a transmission mode switching scenario based on other information such as a type of UE service, and the D2D communication is preferred in a case of a real-time service sensitive to handover. And the absolute velocity of the UE with respect to the base station and the relative velocity of the UE with respect to a target UE may be obtained, for example, by measuring and positioning the UE/target UE in a predetermined period and calculating based on the positions and a time span.

In another example of the present disclosure, in estimating whether a UE is in a communication scenario suitable for D2D communication, relative moving directions of the UE and a target UE may be further determined (for example, an included angle between the moving directions of the UE and the target UE determined with methods such as GPS and AOA), to improve an accuracy of the estimation in conjunction with velocity information. For example, if the included angle between the moving directions of the UE and the target UE is less than 90 degrees, it indicates that the two UEs moves in similar directions. In this case, in estimating whether the UEs are suitable for the D2D communication, a requirement on relative velocity between the UEs may be reduced. For example, two UE with a relative velocity of 4 km/h are considered as UEs with low velocities for the estimation.

2. Adjacent Cell Deployment Density

With rapid development of wireless communication technologies, a deployment of network structures tends to be complicate and dense, thereby bringing more complicate requirement and process to the mobility management and switching operation of UE. In a case that a UE is in a moving state, a mobility state of the UE and a cell location where the UE is may trigger the UE to perform switching frequently. Moreover, unnecessary handover operations and a high handover failure possibility may be caused due to increasingly complicate adjacent cell deployment density.

The above issues can be reduced to a certain extent by switching from the traditional cellular communication mode to the D2D communication mode. For example, in a D2D communication, only one UE of a group of UEs performing the D2D communication needs to keep interacting signaling with the network to ensure a handover of the D2D communication group (for example, including multiple UEs participating in the D2D communication), thereby reducing the number of handover links.

Therefore, in a case that the UE has a specified mobility state, the source base station should consider an adjacent cell deployment density of the UE. The adjacent cell deployment density approximately includes a high deployment density and a low deployment density, as shown in Table 3.

TABLE 3

Adjacent cell deployment density analysis

| Name | Classification | Example |
|---|---|---|
| Adjacent cell deployment density | high | City center, business district, along railway |
| | low | Suburb, open area |

In an example, it can be seen from the above description of UE moving state that, a transmission mode switching scenario, in which an absolute velocity between a UE and a base station is a high velocity, is determined by the base station as a transmission mode switching scenario under high-velocity moving state, such as a high-velocity train scenario. In a case that the absolute velocity between the UE and the base station is a moderate velocity, since it is possible to trigger the UE to hand over to an adjacent cell, the source base station may further determine a transmission mode switching scenario based on an adjacent cell deployment density, such as a transmission mode switching scenario under a high adjacent cell deployment density.

3. UE Service Requirement

Whether a UE is adapted to perform a D2D communication is determined depending on a service requirement of the UE to a certain extent. In a case that a group of UEs request to download same or similar contents from the network, or in a case that a communication service of a large data size is to be interacted between the UEs (such as a concert scenario and a conference scenario), performing a D2D communication can reduce a load of a source cell and improve a system performance.

The UE service requirement is classified approximately based on a service time duration and a service quantity, as illustrated in the following table 4.

TABLE 4

UE service requirement analysis

| Service requirement | Classification | Example |
|---|---|---|
| Time duration of service | instantaneous | Instant message |
| | Continuous | Non-instant message |
| Service quantity | Small data size | Instant message |
| | Moderate data size | Voice call |
| | Large data size | Video-audio download, video call |

Generally, if it is detected by the base station that a UE has a service requirement of continuous large data size, the transmission mode switching mode is determined as a transmission mode switching mode wider a continuous large data size service requirement state. If it is detected by the base station that the UE has a service requirement of continuous moderate data size, a transmission mode switching scenario is further determined in conjunction with a service load of a source cell.

4. Source Cell Load Degree

In a wireless communication system, a load of a cell is increased due to increasing users and service requirements. Therefore, a D2D communication can balance the load to a certain extent. As description related to the UE service requirement in the above, if it is detected by the base station that the UE has a service requirement of continuous moderate data size, the transmission mode switching scenario is further determined in conjunction with the service load situation of the source cell. The cell load degree approximately includes a high load and a low load, as illustrated in the following Table 5. A transmission mode switching scenario in which a cell load degree is the high load is determined by the base station as a transmission mode switching scenario under a load balance state.

TABLE 5

Cell load degree analysis

| Name | Classification | Example |
|---|---|---|
| Cell load degree | High load | City center, business district, residential area |
| | Low load | Suburb |

In the above, factors for determining the first scenario are described. Especially, as some examples, in a case that any one of the following conditions is met, it is determined by the scenario determining unit 110 illustrated in FIG. 2 that the UE 200 illustrated in FIG. 3 is in the first scenario. The conditions include that:

information on UE moving state indicates that a relative velocity between the UE 200 and the UE 300 illustrated in FIG. 4 is low and an absolute velocity between the UE 200 and the base station equipment 100 is high;

information on UE moving state indicates that the absolute velocity between the UE 200 and the base station equipment 100 is moderate, and information on adjacent cell deployment density indicates that an adjacent cell deployment density is high;

information on UE service requirement indicates that the UE service requirement is a continuous large data size; and information on UE service requirement indicates that the UE service requirement is a continuous moderate data size, and information on source cell load degree indicates that a source cell load degree is high.

Figure 5:
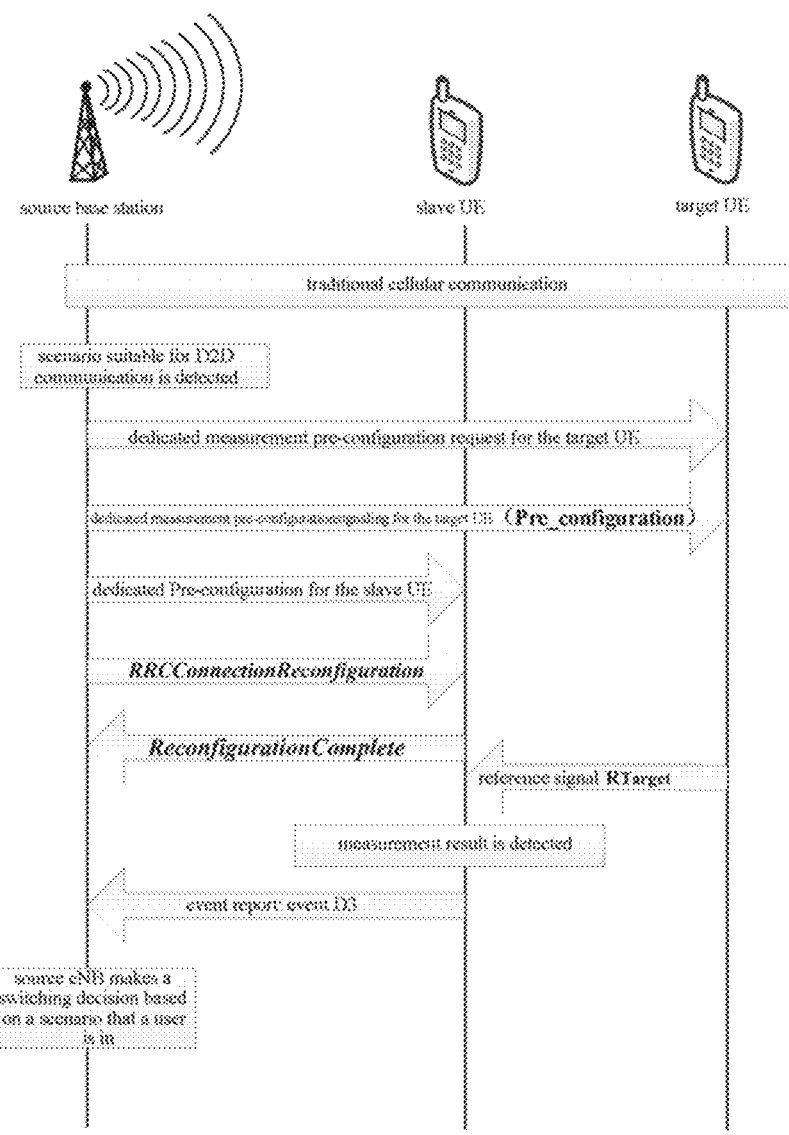
FIG. 5 is a sequence diagram illustrating a communication mode switching method in a wireless communication system according to an embodiment of the present disclosure.

In the following, a process of communication mode switching in a wireless communication system according to an embodiment of the present disclosure is described in conjunction with FIG. 5. FIG. 5 illustrates a process of a communication mode switching in a D2D communication suitable scenario according to an embodiment of the present disclosure.

As illustrated in FIG. 5, a source base station at least performs a wireless communication with a slave UE, and the slave UE performs a wireless communication with a target UE in a traditional cellular communication mode via the source base station.

Firstly, a source serving cell may identify whether a UE in a traditional cellular communication meets a certain suitable scenario for D2D communication.

Next, if it is identified by the source serving cell that the UE performing the traditional cellular communication meets the certain suitable scenario for D2D communication, the source base station transmits a Pre-configuration signaling to the slave UE and the target UE. And the singling carries configuration information related to a measurement performed between the slave UE and the target UE. In the specification, a measurement pre-configuration signaling is transmitted by the base station to the target UE and the slave UE before a D2D measurement is performed. For example, a pre-configuration content for the target UE contains information on resource for transmitting a D2D reference signal, and a pre-configuration content for the slave UE contains contents such as information on resource for the D2D reference signal and ID of the target UE.

Next, the source base station transmits, for example, RRCConnectionReconfiguration signaling, to the slave UE. The signaling includes a series of D2D measurement configuration messages, such as a measurement configuration information element (IE), measConfig, related to the D2D measurement. And the slave UE may transmit, for example, a ReconfigurationComplete confirmation message, to the source base station after completing the measurement configuration. It should be noted that, the Pre-configuration signaling mentioned in the above and the RRCConnection-Reconfiguration signaling here may be combined into one signaling, which is not limited herein.

Especially, in an example, the slave UE may be configured as follows for a measurement.

1> if the received measConfig includes indication information for adding or modifying a D2D measurement object, such as a measObjectToAddModlist information element, including information on a target UE, then 2> the UE performs a process of adding/modifying the measurement object, and adds a new measurement object target UE (or adjacent cell);

1> if the received measConfig includes indication information for adding or modifying a D2D report configuration, such as a reportConfigToAddModiList information element, then:

2> the UE performs a process of adding/modifying a measurement report, and adds a new report configuration related to a D2D event (such as events D1, D2 and D3 which are described in detail hereinafter);

1> if the received measConfig includes indication information for adding or modifying a D2D measurement identifier, such as a measIdToAddModList information element, then:

2> the UE performs a process of adding/modifying the measurement identifier, and adds a new D2D measurement identifier;

1> if the received measConfig includes configuration information of the number of D2D measurements, such as a quantityConfig information element, then:

2> the UE performs a process of configuring the number of measurements, and sets a threshold of the number of D2D measurements;

1> if the received measConfig includes configuration information of D2D measurement gap, such as a meanGapConfig information element, then:

2> the UE performs a process of configuring a measurement gap, and sets a gap and a period needed by a D2D measurement;

3> if the measGapConfig is set as 'setup', then:
    4> if a measurement gap configuration has been established, the measurement gap configuration is released;
    4> a measurement gap represented by measGapConfig is established based on a received gapOffset, i.e. each gap starts at SFN and a sub-frame meets the following conditions:

SPIN mod $T$=FLOOR(gapOffset/10);

subframe=gapOffset mod 10;

where T=MGRP/10; 3>else:
    4> the measurement gap configuration is released.

Examples of measurement gap mode configurations supported by UE are illustrated in the following table 6.

TABLE 6

Measurement gap mode configurations supported by UE

| Gap mode Id | Measurement gap length (MGL, ms) | Measurement gap repeat period (MGRP, ms) | Minimal available time durations of Inter-frequency measurement and inter-access technology measurement within 480 ms (Tinter1, ms) | Measurement target |
|---|---|---|---|---|
| 0 | 6 | 40 | 60 | Inter-frequency (including D2D) E-UTRAN FDD and TDD, UTRAN FDD, GERAN, LCR TDD, HRPD, CDMA2000 1x |
| 1 | 6 | 80 | 30 | Inter-frequency E-UTRAN FDD and TDD, UTRAN FDD, GERAN, LCR TDD, HRPD, CDMA2000 1x |
| 2 | 6 | 120 | 20 | D2D |

It should be noted that, in a case that a base station configures the UE to perform an inter-frequency measurement and configures a measurement gap for the UE, the UE may use, for example, the mode 0 and the mode 2 in the table. It should also be noted that, different measurement gap modes may be selected based on different scenarios. For example, in a general scenario, a requirement may be generally met if the UE uses the gap mode 0. For example, in a high-velocity moving scenario, the UE may select, for example, the gap mode 2 designed for D2D communication. A measurement gap repeat period in the gap mode 2 is longer than that in a traditional gap mode. And/or minimal available time durations of inter-frequency measurement and inter-technology measurement within 480 ms in the gap mode 2 is short. For example, in the high-velocity moving scenario, due to a communication feature of D2D communication, the less the interactions between a UE and a base station are, the more apparent the advantages of a D2D communication mode are. Furthermore, by using the mode 2, signaling interactions between the UE and the base station are reduced while power consumption of the UE is effectively reduced, thereby being better adapted to a complicate wireless moving environment.

Returning to refer to FIG. 5, next, based on the above signaling transmitted by the source base station, the target UE transmits a D2D reference signal $R_{Target}$, and the slave UE performs a related measurement on the target UE.

Next, the slave UE decides based on the above measurement result, and if the quality of a link ($R_{Target}$) is greater than $Thresh_{D2D2}$, fills into an event report (event D3) corresponding to the quality.

Here, in a D2D suitable scenario, if it is measured that a measured value of a link between the target UE and the slave UE is higher than $Thresh_{D2D2}$, it indicates that the event D3 is met. Therefore, $Thresh_{D2D2}$ is a meeting threshold of the event D3, of which a magnitude depends on simulation and experimental results.

In the present disclosure, the event D3 represents that the target UE is better than a threshold condition. For example, the event D3 may be defined as follows.
  1> if the following inequality D3-1 is met, it is considered that an entering condition of the event is met;
  1> if the following inequality D3-2 is met, it is considered that an exiting condition of the event is met;
    the inequality D3-1 (entering condition) is:

$$Md+Ofd-Hys > Thresh_{D2D2};\text{ and}$$

the inequality D3-2 (exiting condition) is:

$$Md+Ofd-Hys > Thresh_{D2D2}.$$

Definitions of variations in the formula are as follows.

Md is a measured result by the slave UE on the target UE, regardless of calculating any offset.

Ofd is a frequency specified offset of a frequency of the target user. It should be noted that, values of the frequency specified offsets of target users are the same and are not different due to different users, which can be determined based on an experiment.

Hys is a lag parameter of the event D3 (i.e. hysteresis is a parameter defined in reportConfigEUTRA for the event).

A unit of Md is dBm (in a case that Md represents RSRP), or dB (in a case that Md represents RSRQ).

Units of both Hys and Ofd are dB.

$Thresh_{D2D2}$ is a threshold parameter of the event (i.e. d3-$Thresh_{D2D2}$ is defined in reportConfigEUTRA for the event).

Especially, in an example, the slave UE may trigger a measurement report as follows.
  1> If the received measConfig contains quantityConfig, then:
    2> if a corresponding reportConfig contains a target configuration as 'reportD2D', then:
      3> if an eventD1 or eventD3 is configured in the reportConfig, then:
        4> only effective in the serving cell;
    2> if a triggerType is set as 'event' and an item condition is suitable for the event, an event corresponding to an eventide of the reportConfig in a VarMeasConfig is completed. The event is adapted to report a trigger clock in a D2D measurement result defined in the VarMeasConfig. For example, if all measurements on the target UE after a L3 layer filtering are completed within a period of time: timeToTrigger and the VarMeasReportList does not contain a measurement report item of the measId, then:
      3> one measurement report item of the measId is contained in the VarMeasReportList;
      3> a numberOfReportsSent defined by the measId in the VarMeasReportList is set as 0:

3> a related target UE is contained in a cellsTriggeredList defined by the measId in the VarMeasReportList;
3> a measurement report process is initiated;
2> if the triggerType is set as 'event', the exiting condition is suitable for the event and the event is adapted to measurement report items, of all measurements of a target UE which are included in the VarMeasReportList suitable for the measId and are completed after the L3 layer filtering within time duration of timeToTrigger defined by the VarMeasConfig, then:
3> a target UE contained in cellsTriggeredList defined in the VarmeasReportList for the measId is removed;
3> for a report configuration, if a reportOnLeave is set as TRUE, then:
4> a measurement report process is initiated;
2> if a T321 of the measId is timeout:
3> one measurement report item of the measId is contained in the VarMeasReportList;
3> a numberOfReportsSent in the VarMeasReportList and defined by the measId is set as 0;
3> a measurement report process is initiated.

Returning to refer to FIG. 5, next, the source base station makes a decision for performing a transmission mode switching on the slave UE, based on the measurement report and for example, a scenario the slave UE is in. And the slave UE performs a transmission mode switching based on the decision.

According to an embodiment of the present disclosure, if the slave UE is in the first scenario and the measurement report indicates that a measured value of the quality of a D2D communication link between the slave UE and the target UE is greater than the predetermined threshold (such as $Thresh_{D2D2}$), it is determined by the switching determination unit 170 of the base station equipment 100 that the communication mode is to be switched from the traditional communication mode to the D2D communication mode.

Especially, for the measId triggering the measurement report, the slave UE may set a measResults in a MeasurementReport message in the following way:
1> setting the measId as a measurement identifier for triggering the measurement report of the slave UE;
1> adding 1 to the numberOfReportsSent in the VarMeasReportList defined by the measId;
1> stopping a period report timer of the slave UE if the timer is running; and
1> submitting the MeasurementReport message to an underlayer transmission until the process is ended.

It should be noted that, the name of the UE in a measurement process is a description of a function and effect of the UE in the measurement process, and does not represent a description of a communication function after the transmission mode is switched to the D2D mode.

Figure 6:
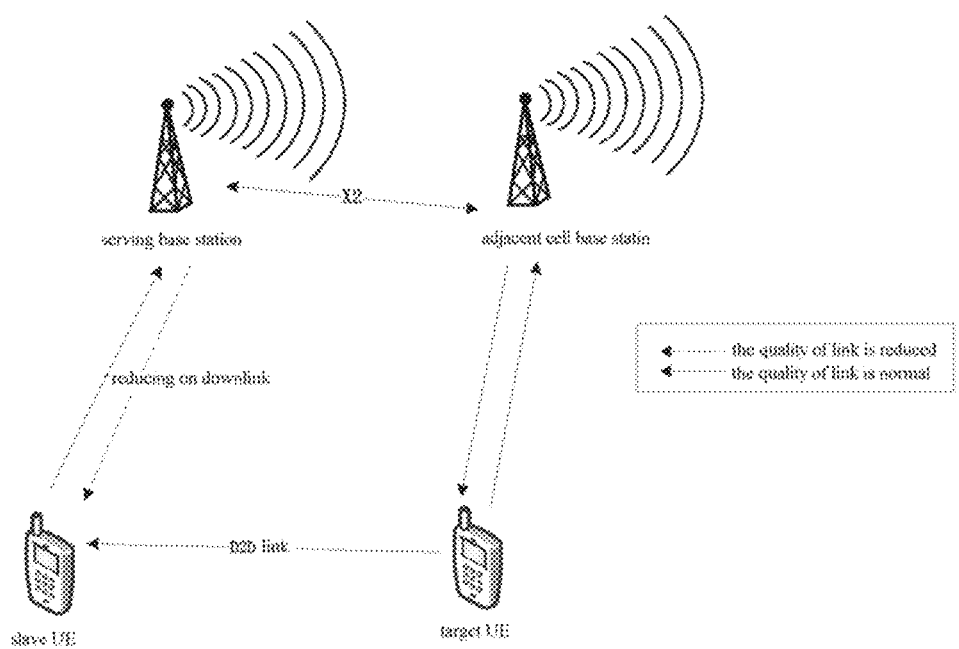
FIG. 6 is a schematic diagram illustrating a scenario in which a communication mode switching is performed in a wireless communication system according to an embodiment of the present disclosure.

The UEs participating in the measurement process are distinguished and classified based on functions. FIG. 6 illustrates an example of classifying a slave UE and a target UE. As illustrated in FIG. 6, a detected quality change of a traditional cellular link between a serving cell and a UE is taken as a precondition for performing a configuration related to a D2D measurement. In view of a reciprocity of terminals transmitting and receiving measurement signals, when the base station starts a D2D measurement process, different UEs participating in the measurement may present different functions. A UE may be a slave UE or a target UE. The function set for UE depends on changing situations of a traditional uplink and downlink. FIG. 6 illustrates a situation of two base stations. Of course, the classification is also adapted to a situation of one base station.

In addition, for one UE, a function setting criterion in a measurement process may be as follows.

Slave UE: a UE of which the quality of a traditional link is reduced and triggers a measurement starting threshold is a slave UE, and a UE communicates with the slave UE is configured as a target UE. The slave UE is configured to measure a reference signal transmitted by the target UE and transmit a measurement report to its source serving cell base station, in a D2D measurement process.

Target UE: the base station configures another UE communicates with the slave UE as a target UE, and the target UE is configured to transmit a D2D reference signal.

It can be seen that, with respect to each UE, in the measurement process, a measured result and a decision for a transmission mode switching of the UE made by the base station after the measurement report is reported, both depend on function and effect of the UE.

Figure 11:
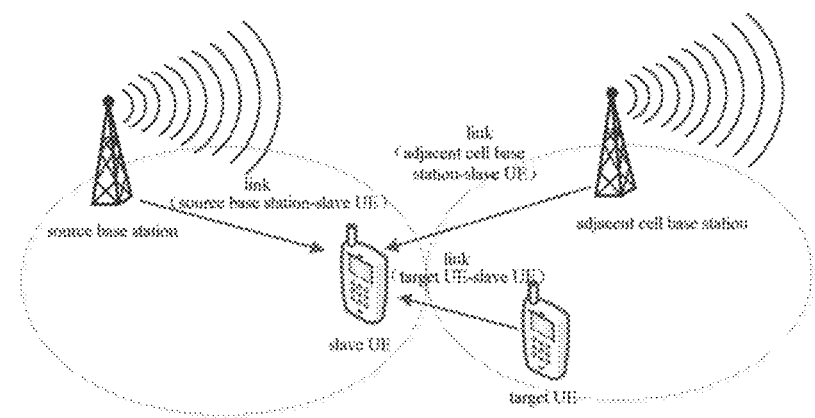
FIG. 11 is a schematic diagram illustrating a scenario in which a communication mode switching is performed in a wireless communication system according to an embodiment of the present disclosure.

For UEs belonging to different base stations, measurement information reported by a UE firstly is reported to a source serving base station of the UE. Via an X2 interface, an adjacent cell base station transmits a measured result between the adjacent cell base station and the UE to the source serving base station of the UE. The source serving base station performs a communication mode switching decision on the UE after a comparison. FIG. 11 described in details subsequently illustrates a scenario in which a communication mode switching is performed in a wireless communication system in a case that UEs belong to different base stations.

According to an embodiment of the present disclosure, in a case that UEs belong to a same base station, the target UE may perform a wireless communication with the base station, and the measuring unit 230 of the slave UE 200 may measure the quality of a D2D communication link between the slave UE 200 and the target UE 300 based on a reference signal transmitted by the target UE 300 and received by the receiving unit 210 of the slave UE 200.

In another aspect, in a case that the UEs belong to different base stations, as illustrated in FIG. 11, the serving base station performs a wireless communication with the slave UE, and an adjacent cell base station adjacent to the serving base station performs a wireless communication with the target UE. In this case, based on a reference signal transmitted by the target UE 300 and received by the receiving unit 210 of the slave UE 200, the measuring unit 230 of the slave UE 200 may measure the quality of the D2D communication link between the slave UE 200 and the target UE 300, and the measuring unit 230 may further measure the quality of a communication link between the slave UE 200 and the adjacent cell base station.

It should be noted that, a token quantity of a channel measurement between D2D users is defined as the quality of a D2D link, and a representation form of the quality of D2D link is not limited. For example, the quality of the D2D link may be represented with a traditional measurement quantity RSRP/RSRQ, or with other D2D link quality tokens such as a path loss of a D2D user link or a Signal to Interference and Noise Ratio (SINR).

The target UE transmits a D2D link reference signal after negotiating with the slave UE beforehand, and the slave UE measures the strength of the reference signal after receiving the reference signal.

The D2D link reference signal may be a Sounding Reference Signal (SRS) which is at an end of a sub-frame and is not associated with PUCCH.

The D2D link reference signal may be a demodulation reference signal (DMRS) which is at an end of a sub-frame and is associated with PUCCH.

The quality of the D2D link may be represented as a traditional measurement quantity RSRP/RSRQ, a ratio of transmit power and path loss (transmit power-pathloss), a Signal to Interference and Noise Ratio (SINR) and the like, thereby facilitating a comparison.

The above descriptions of the D2D link reference signal and the quality of the D2D link are all exemplary, and are not intended to limit the representing forms.

Figures 7, 8:
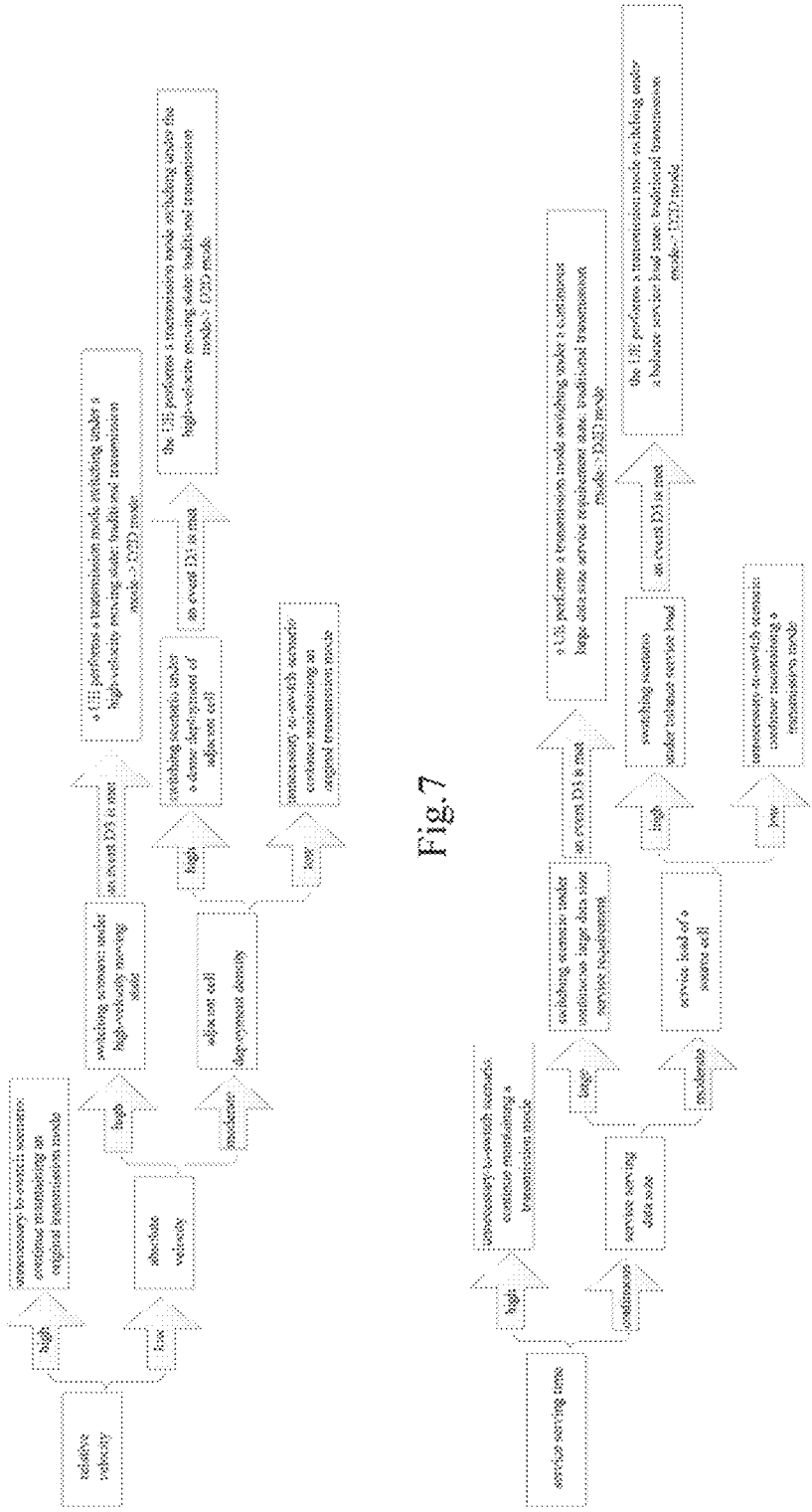
FIG. 7 is a flowchart illustrating a communication mode switching method in a wireless communication system according to an embodiment of the present disclosure.
FIG. 8 is a flowchart illustrating a communication mode switching method in a wireless communication system according to an embodiment of the present disclosure.

In the following, an example of a determining the first scenario is described in conjunction with FIG. 7 and FIG. 8. FIG. 7 and FIG. 8 illustrate a deciding process of a base station. Especially, a scenario that a UE is in may approximately include: a) mobility scenario as illustrated in FIG. 7; and b) a service requirement scenario as illustrated in FIG. 8.

Referring to FIG. 7, for the mobility scenario, a switching decision made by the source base station based on the event D3 may be described with the following process.

1> If a relative velocity between UEs is low,
  2> if a velocity of a UE with respect to a base station is high,
    3> a source base station decides the above scenario as a moving state switching scenario in a high-velocity moving state
      4> if the event D3 is met
        5> the above UE is suitable for a D2D communication, and a communication mode of the UE is switched from a traditional cellular communication mode to a D2D communication mode in the switching scenario;
  2> if the velocity of the UE with respect to the base station is moderate,
    3> if an adjacent cell deployment density of the UE is high,
      4> the source base station decides the above scenario as a switching scenario of a dense adjacent cell deployment;
      5> if the event D3 is met,
        6> the above UE is suitable for a D2D communication, and a communication mode of the UE is switched from a traditional cellular communication mode to the D2D communication mode in the switching scenario;
    3> if the adjacent cell deployment density of the UE is low, the source base station decides the scenario as an unnecessary-to-switch scenario:
1> if the relative velocity between the UEs is high, the source base station decides the scenario as an unnecessary-to-switch scenario.

Referring to FIG. 8, for the service requirement scenario, the switching decision made by the source base station based on the event D3 may be described with the following process.

1> If a service serving time requirement of a UE is continuous,
  2> if a service serving data requirement of the UE is a large data size,
    3> the source base station decides the scenario as a switching scenario of continuous large data service requirement;
      4> if the event D3 is met,
        5> the above UE is suitable for the D2D communication, and a communication mode of the UE is switched from a traditional cellular communication to the D2D communication mode;
  2> if the service serving data requirement of the UE is a moderate data size,
    3> if a load of a source cell that the UE is in is high,
      4> the source base station decides the scenario as a switching scenario of balance service load;
      5> if the event D3 is met,
        6> the above UE is suitable for the D2D communication, and a communication mode of the UE is switched from a traditional cellular communication to the D2D communication mode;
    3> if the load of the source cell that the UE is in is low, the source base station decides the scenario as an unnecessary-to-switch scenario;
1> if the service serving time requirement of the UE is instantaneous, the source base station decides the scenario as an unnecessary-to-switch scenario.

In the above, the embodiments of the present disclosure are described with regard to the first scenario. In the first scenario, if a first UE performs a D2D communication with a second UE, a system gain can be improved. The technical solutions of the present disclosure may be also applied in a second scenario. In the second scenario, a measurement value of the quality of a communication link between a UE and a base station equipment is less than a predetermined value. In a case that the quality of the link between the UE and a source base station keep deteriorating, the source base station triggers the UE to perform a measurement as a slave UE based on a deterioration situation.

According to an embodiment of the present disclosure, as illustrated in FIG. 2, the base station equipment 100 may further include a scenario determining unit 120. The scenario determining unit 120 may determine whether a UE, i.e. the slave UE, is in the second scenario. In the second scenario, a measured value of the quality of a communication link between the slave UE and the base station equipment is less than the predetermined threshold.

If it is determined by the scenario determining unit 120 that the slave UE is in the second scenario, the setting unit 140 of the base station equipment 100 may set the configuration information as described above, and the transmitting unit 150 of the base station 100 may transmit the configuration information to trigger a communication link quality measurement between the slave UE and another UE, i.e. a target UE.

Especially, in a case that the quality of a link of the serving cell is reduced and is lower than a predetermined threshold ($Thresh_{D2D1}$), the source base station transmits a measurement pre-configuration (Pre-configuration) message to the UE (i.e. the slave UE) and the target UE, to notify the target UE to transmit a reference signal at a specified frequency and notify the slave UE to perform a measurement at the frequency.

As described in the above, in the specification, the measurement pre-configuration (Pre-configuration) signaling is transmitted by the base station to the target UE and the slave UE before the D2D measurement is performed. For example, a pre-configuration content for the target UE contains information on resource for transmitting the reference signal, and a pre-configuration content for the slave UE contains contents such as information on resource of a D2D reference signal and the ID of the target UE.

Besides, in the second scenario, if it is detected by the UE that the measured value of the traditional cellular communication link is less than $Thresh_{D2D1}$, the UE gives a report to the base station and initiates a D2D measurement. Therefore, $Thresh_{D2D1}$ is a threshold for initiating a D2D measurement in the second scenario, and the magnitude of $Thresh_{D2D1}$ may depend on simulation and experimental results.

According to an embodiment of the present disclosure, in a case that the slave UE and the target UE belong to a same base station, a source base station may perform a wireless communication with the target UE. If the slave UE is in the second scenario and the measurement report indicates that the quality of the D2D communication link between the slave UE and the target UE is higher than the quality of the communication link between the slave UE and the base station equipment, the switching determination unit 170 of the base station equipment 100 can determine that the communication mode is to be switched from the traditional cellular communication mode to the D2D communication mode.

Figure 9:
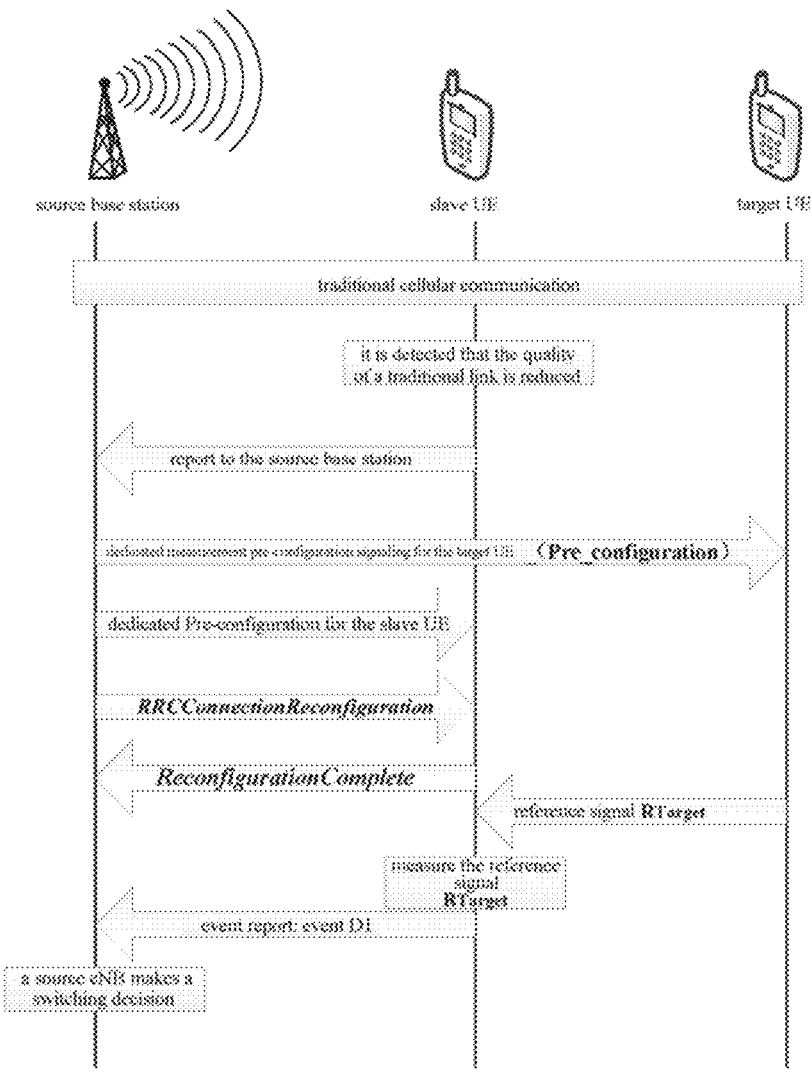
FIG. 9 is a sequence diagram illustrating a communication mode switching method in a wireless communication system according to an embodiment of the present disclosure.

FIG. 9 illustrates a process of a communication mode switching performed by the slave UE in the second scenario in a case that the slave UE and the target UE belong to a same base station.

As illustrated in FIG. 9, the source base station performs wireless communications with the slave UE and the target UE, and the slave UE performs a wireless communication with the target UE in a traditional cellular communication mode via the source base station.

Firstly, the slave UE detects that the quality of the traditional cellular link between the source serving cell and the slave UE is reduced to a value less than the threshold $Thresh_{D2D1}$ and reports to the source base station. The source base station detects that the slave UE and the target UE being in the communication meet a distance condition for D2D communication, and the two UEs are in a same cell.

Next, the source base station transmits Pre-configuration signaling to the slave UE and the target UE. The signaling carries configuration information related to a measurement between the slave UE and the target UE.

Next, the source base station transmits RRCConnectionReconfiguration signaling to the slave UE, including a series of D2D measurement configuration information. And the slave UE transmits a ReconfigurationComplete confirmation message to the source base station after completing the D2D measurement configuration.

In response to the above signaling, the target UE transmits a D2D reference signal $R_{Target}$, and the slave UE performs a related measurement on the target UE.

After that, in a case that a series of measurement results meet the event D1, the slave UE transmits a measurement report to the source base station.

Herein, the event D1 indicates that the target UE serves better than a serving cell of the slave UE. The event D1 may be defined as follows.

1> If a non-equality D1-1 is met, it is considered that an entering condition of the event is met;
1> if a non-equality D1-2 is met, it is considered that an exiting condition of the event is met:
 the non-equality D1-1 (entering condition) is:

$Md+Ofd-Hys>Ms+Ofs+Ocs+Off,$

The non-equality D1-2 (exiting condition) is:

$Md+Ofd+Hys<Ms+Ofs+Ocs+Off,$

Variations in the formulas are defined as follows.
Md is a measurement result of the target UE, regardless of calculating any offset.
Ofd is a frequency specified offset of a frequency of the target user.

Ofs is a frequency specified offset of a frequency of the source serving cell.
Ocs is a cell specified offset of the source serving cell.
Ms is a measurement result of the source serving cell without calculating any offset.
Hys is a lag parameter of the event (i.e. a hysteresis is a parameter defined in a reportConfigEUTRA for the event).
Off is an offset parameter of the event (i.e. dl-Offset is a parameter defined in the reportConfigEUTRA for the event).
Units of Md and Ms are dBm (in a case that Md and Ms represent RSRP) or dB (in a case that Md and Ms represent RSRQ).
Units of Hys, Ofd, Ofs, Ocs and Off are dB.

Returning to refer to FIG. 9, next, the source base station makes a transmission mode switching decision for the slave UE based on the measurement report. That is, if the event D1 is met, the UE is switched from the traditional cellular mode to the D2D mode. And the slave UE performs a switching process of related transmission modes based on the decision.

In the above, details of the measurement configuration performed by the slave UE, the measurement report triggering and measurement report are described in conjunction with FIG. 5, and are not described again herein.

According to an embodiment of the present disclosure, in a case that a slave UE and a target UE belong to different base stations, an adjacent base station adjacent to the base station 100 may perform a wireless communication with the target UE. In a case that the slave UE is in the second scenario and a measurement report indicates that the quality of a D2D communication link between the slave UE and the target UE is higher than both the quality of a communication link between the slave UE and the base station equipment 100 and the quality of a communication link between the slave UE and the adjacent base station equipment, it is determined by the switching determination unit 170 of the base station equipment 100 that the communication mode is to be switched from the traditional cellular communication mode to the D2D communication mode.

Figure 10:
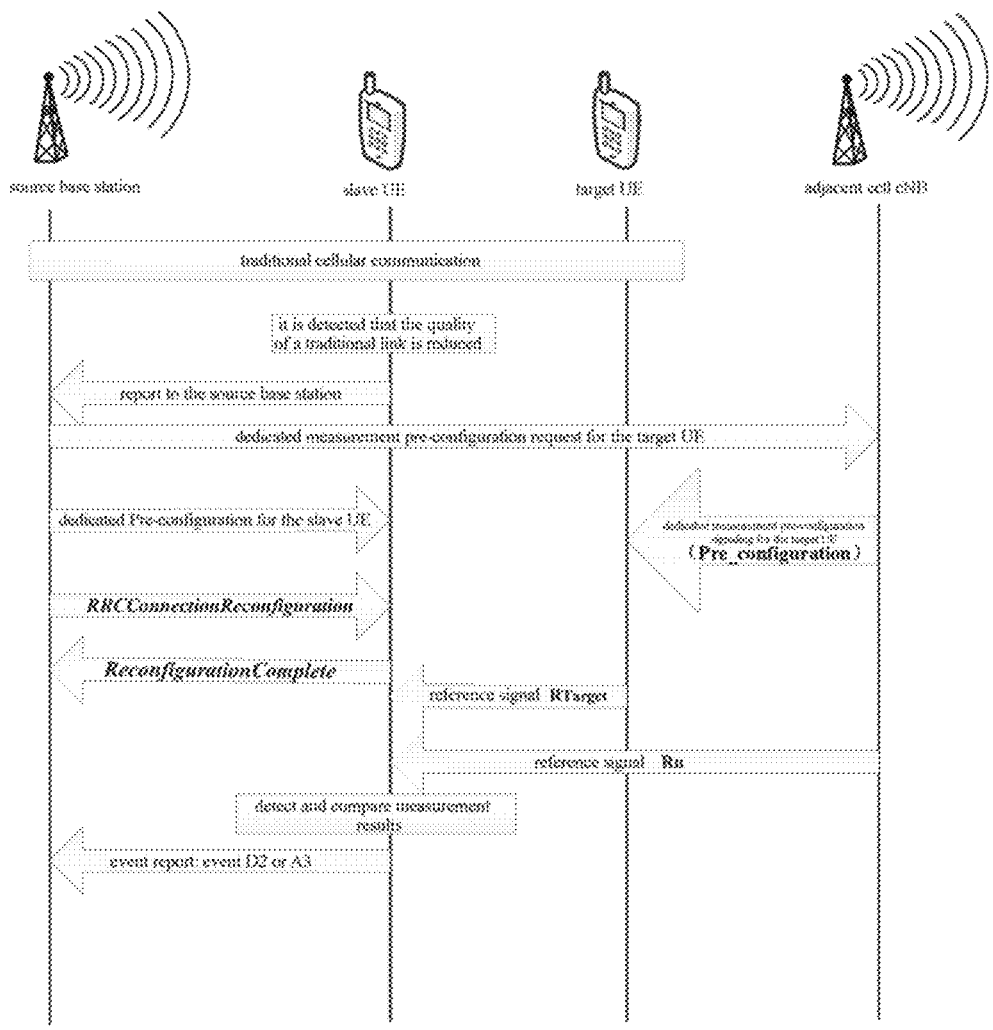
FIG. 10 is a sequence diagram illustrating a communication mode switching method in a wireless communication system according to an embodiment of the present disclosure.

FIG. 10 illustrates a process of a communication mode switching of a slave UE in the second scenario in a case that the slave UE and the target UE belong to different base stations. And FIG. 11 illustrates a scenario in which a communication mode switching is performed on the slave UE in the second scenario in a case that the slave UE and the target UE belong to different base stations.

As illustrated in FIG. 10 and FIG. 11, the source base station performs a wireless communication with the slave UE, an adjacent cell eNB performs a wireless communication with the target UE, and the slave UE performs a wireless communication with the target UE in the traditional cellular communication mode via the source base station and the adjacent cell eNB.

Firstly, the slave UE detects that the quality of a traditional cellular link between the source serving cell and the slave UE is reduced to a value less than the threshold $Thresh_{D2D1}$ and reports to the source base station. And the source base station detects that the slave UE and the target UE being in the communication meet a distance condition for a D2D communication and the target UE is in the adjacent cell.

Next, the source base station performs a signaling interaction with the adjacent cell base station that the target UE belongs to, and the adjacent cell base station transmits Pre-configuration signaling to the target UE. The signaling carries configuration information related to a measurement between the slave UE and the target UE.

Next, the source base station transmits Pre-configuration signaling to the slave UE. The signaling carries configuration information related to a measurement between the slave UE and the target UE.

Next, the source base station transmits RRCConnectionReconfiguration signaling to the slave UE, including a series of measurement configuration messages, and the slave UE transmits a ReconfigurationComplete confirmation message to the source base station.

In response to the above signaling, the target UE transmits a D2D reference signal $R_{Target}$, the adjacent cell transmits a traditional reference signal Rn, and the slave UE performs related measurements on the target UE and the adjacent cell base station.

Next, the slave UE compares and makes a decision based on the above measurement result, and fills into a corresponding report (event D2 or event A3).

Herein, the event D2 indicates the target UE serves better than the serving cell and the target UE is better than the adjacent cell. That is:

Event D2: quality of link (target UE-slave UE)>quality of link (source base station-slave UE), and quality of link (target UE-slave UE)>quality of link (adjacent cell base station-slave UE), Especially, the event D2 may be defined as follows.

1> If a non-equality D2-1 and a non-equality D2-2 are met, it is considered that entering conditions of the event are met;

1> if a non-equality D2-3 or a non-equality D2-4 is met, that is, at least one of the non-equalities D2-3 and D2-4 is met, it is considered that an exiting condition of the event is met;

the non-equality D2-1 (entering condition 1) is:

$$Md+Ofd-Hys>Ms+Ofs+Ocs+Off,$$

the non-equality D2-2 (entering condition is:

$$Md+Ofd-Hys>Mn+Ofn+On+Off;$$

the non-equality D2-3 (exiting condition 1) is:

$$Md+Ofd+Hys<Ms+Ofs+Ocs-Off,$$

the non-equality D2-4 (exiting condition 2) is:

$$Md+Ofd+Hys<Mn+Ofn+Ocn+Off;$$

Variations in the formulas are defined as follows.

Mn is a measurement result of the adjacent cell, regardless of calculating any offset.

Ofn is a frequency specified offset of a frequency of the adjacent cell.

Ocn is a cell specified offset of the adjacent cell.

Hys is a lag parameter of the event (that is, a hysteresis is a parameter defined in a reportConfigEUTRA for the event)

Definitions of other variations of the event D2 may refer to the definition of the event D1, and are not described again hereinafter.

Here, the event A3 is a traditional event A3, that is:

Event A3: quality of link (adjacent cell base station—slave UE)>quality of link (source base station-slave UE).

Especially, as illustrated in FIG. 11, in a case that UEs are in multiple cells, a measurement report should be interacted from the source serving base station of the slave UE to the adjacent cell base station and the source base station of the target UE via an X2 interface. And the interaction result is acquired and analyzed by the source serving base station of the slave UE, thereby making a transmission mode switching decision for the slave UE.

Next, the source base station makes the transmission mode switching decision for the slave UE. If the event D2 is met (no matter whether the event A3 is met), it is decided by the base station that the transmission mode is to be switched from the traditional cellular mode to the D2D mode. If the event A3 is met and the event D2 is not met, it is decided by the base station to handover the slave UE to an adjacent target cell. The slave UE performs a process of related transmission mode switching based on the decision.

In the above, the embodiments of the present disclosure are described based on the first scenario and the second scenario. The technical solutions of the present disclosure may be further applied in a third scenario. In the third scenario, a measured value of the quality of a D2D communication link between the slave UE and the target UE is less than a predetermined threshold.

According to an embodiment of the present disclosure, as illustrated in FIG. 2, the base station equipment 100 may further include a scenario determining unit 130. The scenario determining unit 130 may determine whether a UE, i.e. the slave UE, is in the third scenario. In the third scenario, the measured value of the quality of the D2D communication link between the slave UE and the target UE is less than the predetermined threshold.

If it is determined by the scenario determining unit 130 of the base station equipment 100 that the slave UE is in the third scenario, the setting unit 140 of the base station equipment may set configuration information as described in the above. And the transmitting unit 150 of the base station unit 100 may transmit configuration information to trigger a D2D communication link quality measurement between the slave UE and a third UE (another target UE).

In addition, if the slave UE is in the third scenario and a measurement report indicates that the quality of the communication link between the slave UE and another target UE is higher than the quality of the D2D communication link between the slave UE and the target UE, it is determined by the switching determination unit 170 of the base station equipment 100 that a D2D communication mode between the slave UE and the target UE is to be switched to a D2D communication mode between the slave UE and another target UE.

Especially, if it is detected by a UE performing a D2D communication that the measured value of the D2D communication link is less than $Thresh_{D2D3}$, it indicates that an event D4 is met partially. Therefore, $Thresh_{D2D3}$ is a meeting threshold of the event D4, and its magnitude depends on simulation and experimental results.

Here, the event D4 indicates that the second target UE serves better than the first target UE. And especially, the event D4 may be defined as follows.

1> If the following non-equalities D4-1 and D4-2 are met, it is considered that entering conditions of the event are met:

1> if the following non-equalities D4-3 or D4-4 are met, i.e. at least one of D4-3 and D4-4 is met, it is considered that an exiting condition of the event is met;

the non-equality D4-1 (entering condition 1) is:

$$Md_1+Ofd_1-Hys<Thresh_{D2D3}$$

the non-equality D4-2 (entering condition 2) is:

$$Md_2+Ofd_2-Hys>Md_1+Ofd_1+Off$$

the non-equality D4-3 (exiting condition 1) is:

$$Md_1+Ofd_1+Hys>Thresh_{D2D3}$$

the non-equality D4-4 (exiting condition 2) is:

$$Md_2+Ofd_2+Hys>Md_1+Ofd_1+Off$$

Variations in the formulas are defined as follows.

$Md_1$ is a measurement result of the first target UE, regardless of calculating any offset.

$Ofd_1$ is a frequency specified offset of a frequency of a first target user.

$Md_2$ is a measurement result of the second target UE, regardless of calculating any offset.

$Ofd_2$ is a frequency specified offset of a frequency of a second target user.

Hys is a lag parameter of the event (i.e. a hysteresis is a parameter defined in a reportConfigEUTRA for the event).

Off is an offset parameter of the event (i.e. a d1-Offset is a parameter defined in the reportConfigEUTRA for the event).

$Thresh_{D2D3}$ is a threshold parameter of the event (i.e. a d4-$Thresh_{D2D3}$ is a parameter defied in the reportConfigEUTRA for the event).

Units of $Md_1$ and $Md_2$ are dBM (in a case that $Md_1$ and $Md_2$ represent RSRP), or dB (in a case that $Md_1$ and $Md_2$ represent RSRQ).

Units of Hys, $Ofd_1$, $Ofd_2$ and Off are dB.

According to an embodiment of the present disclosure, as illustrated in FIG. 3, the measuring unit 230 of the slave UE 200 may further measure the quality of a D2D communication link between the slave UE 200 and another target UE. And based on switching information from the base station equipment, the switching unit 250 of the slave UE 200 may switch the D2D communication mode between the slave UE and the target UE to the D2D communication mode between the slave UE and another target UE.

Figure 12:
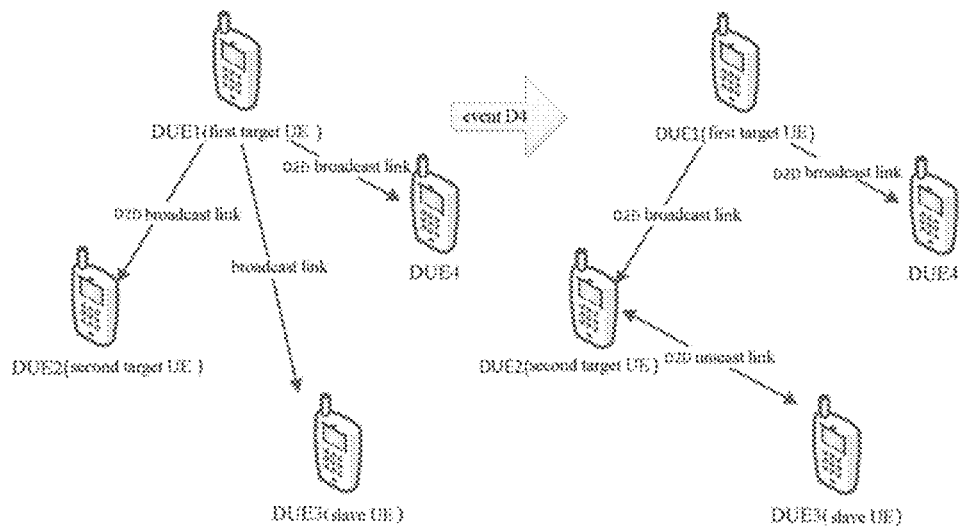
FIG. 12 is a schematic diagram illustrating a scenario in which a communication mode switching is performed in a wireless communication system according to an embodiment of the present disclosure.
Figure 13:
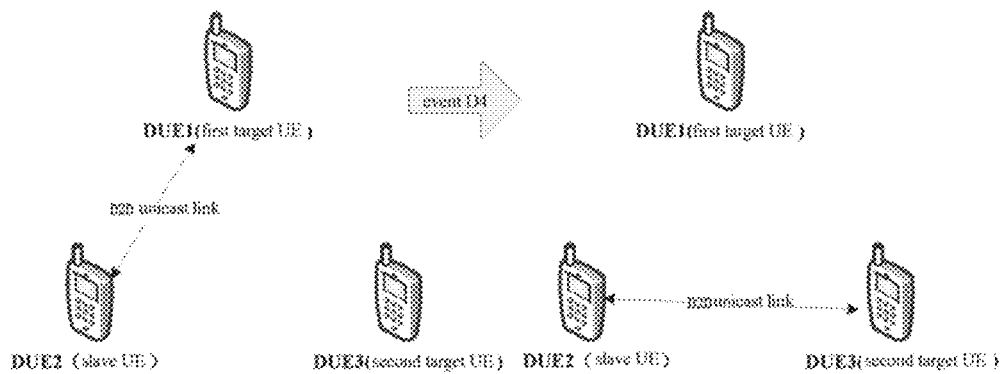
FIG. 13 is a schematic diagram illustrating a scenario in which a communication mode switching is performed in a wireless communication system according to an embodiment of the present disclosure.

In the following, a switching between D2D communication modes is described in conjunction with FIG. 12 and FIG. 13. FIG. 12 illustrates a scenario in which a D2D broadcast communication mode is switched to a D2D unicast communication mode. And FIG. 13 illustrates a scenario in which a first target UE in a D2D unicast communication mode is switched to a second target UE.

Firstly, a slave UE is performing a D2D communication (broadcast or unicast). If it is detected by the slave UE that the quality of a communication link between the slave UE and a target UE of the slave UE is reduced to a value less than the threshold $Thresh_{D2D3}$, and another potential target UE exists around the slave UE, the slave UE reports to its source base station.

Next, the source base station transmits Pre-configuration signaling to both the slave UE and the potential target UE. The signaling carries configuration information on a measurement between the slave UE and the target UE.

Next, the source base station transmits RRCConnectionReconfiguration signaling to the slave UE, including a series of measurement configuration messages. And the slave UE transmits a confirmation message, ReconfigurationComplete, to the source base station.

Based on the above signaling, the target UE transmits a D2D reference signal $R_{Target}$, and the slave UE performs a related measurement on the target UE.

In a case that a series of measurement results meet the event D4, the slave UE transmits a measurement report to the source base station.

Next, the source base station makes a transmission mode switching for the slave UE based on the measurement report. That is, if the event D4 is met, a communication mode between the pair of UEs is switched from a D2D communication mode to another D2D communication mode, such as from broadcast to unicast, from unicast to broadcast or from unicast to unicast. The slave UE performs transmission mode switching processes with the respective target UEs, based on the decision.

It should be noted that, the "switching from the conventional cellular communication mode to the D2D communication mode" described herein indicates that it can be considered to enter a D2D communication mode as long as at least one data connection is directly connected between UEs, instead of being limited to cutting off the traditional cellular connection to establishing a D2D connection. Therefore, the cellular connection between the D2D UEs which are switched into the D2D mode may not be disconnected. Or, a data link on the cellular may be disconnected while a control link is maintained, and a D2D data link is established.

In addition, in the present disclosure, a switching time duration mainly includes two parameters: Hys (hysteresis factor) and TTT (triggering factor). Firstly, the switching time parameters corresponding to a D2D mode are different from traditional switching time parameters, and are generally a little shorter than the traditional switching time parameters. Secondly, the base station may adjust the two parameters based on different scenarios. Each of the two parameters: Hys (hysteresis factor) and TTT (triggering factor) may be provided with a long time duration and a short time duration. In this case, the base station provides different configurations in response to a scenario requirement, and it can be ensured to effectively enter a D2D mode by reducing or increasing a switching time duration.

In the following, a wireless communication method in a wireless communication system is described. The method includes: setting, by an electronic equipment in the wireless communication system, for a first UE served by the electronic equipment, configuration information for a Device-to-Device communication measurement, the configuration information containing information on a reference signal of a second UE being a candidate object for a D2D communication of the first UE; transmitting the configuration information, to trigger a communication link quality measurement between the first and second UEs; receiving a measurement report from the first user equipment; determining, based on the measurement report, whether a communication object of the first user equipment is to be switched from a current communication object to the second UE; and transmitting switching information to notify the first and second user equipments to communicates with each other, if it is determined that the communication object of the first user equipment is to be switched from the current communication object to the second user equipment.

Preferably, the current communication object may be a base station equipment or another user equipment.

Preferably, the information on the reference signal of the second UE may include information on physical resource carrying the reference signal.

Preferably, the electronic equipment may further transmit configuration information for indicating the physical resource utilized by the second UE to transmit the reference signal.

Preferably, the electronic equipment may cause the configuration information to be contained in Radio Resource Control (RRC) signaling to transmit the configuration information to the first UE.

Preferably, the reference signal may be at least one of a Sounding Reference Signal (SRS) and a Demodulation Reference Signal (DMRS)

Preferably, the electronic equipment may perform a wireless communication with the first UE, the first UE performs a wireless communication with the second UE in a traditional cellular communication mode via the electronic equipment, and the method may further include: determining whether the first UE is in a first scenario in which a system gain is improved if a D2D communication is performed between the first UE and second UE, if it is determined that the first UE is in the first scenario, the setting unit initiates a setting of the configuration information; transmitting the configuration information, to trigger the communication link quality measurement between the first UE and second UE; receiving the measurement report from the first UE; determining, based on the first scenario and the measurement report, whether the communication mode between the first UE and second UE is to be switched from the traditional cellular communication mode to a D2D communication mode; and if it is determined that the communication mode is to be switched from the traditional cellular communication mode to the D2D communication mode, transmitting switching information to notify the first UE and second UE to perform a communication mode switching.

Preferably, the base station equipment may determine whether the first user equipment is in the first scenario based on at least one of information on UE moving state, information on UE service requirement, information on adjacent cell deployment density, and information on source cell load degree.

Preferably, it is determined by the base station equipment that the first UE is in the first scenario if any of the following conditions is met:

the information on UE moving state indicates that a relative velocity between the first and second UEs is low and an absolute velocity between the first UE and the base station equipment is high;

the information on user equipment moving state indicates that the absolute velocity between the first UE and the base station equipment is moderate, and the information on adjacent cell deployment density indicates that an adjacent cell deployment density is high;

the information on user equipment service requirement indicates that a UE service requirement is a continuous large data size; and the information on user equipment service requirement indicates that the UE service requirement is a continuous moderate data size, and the information on source cell load degree indicates that a source cell load degree is high.

Preferably, it is determined by the base station equipment that the communication mode is to be switched from the traditional cellular communication mode to the D2D communication mode if the first UE is in the first scenario and the measurement report indicates that a measured value of the quality of a D2D communication link between the first and second UEs is greater than a first predetermined threshold.

Preferably, the method may further include: determining whether the first UE is in a second scenario in which a measured value of the quality of a communication link between the first UE and the base station equipment is less than a second predetermined threshold. If it is determined by the base station equipment that the first user equipment is in the second scenario, the base station equipment may set the configuration information and transmit the configuration information, to trigger the communication link quality measurement between the first and second UEs.

Preferably, the base station may performs a wireless communication with the second UE, and it is determined by the base station equipment that the communication mode is to be switched from the traditional cellular communication mode to the D2D communication mode in a case that the first UE is in the second scenario and the measurement report indicates that the quality of the D2D communication link between the first and second UEs is higher than the quality of a communication link between the first user equipment and the base station.

Preferably, an adjacent base station equipment adjacent to the base station equipment may perform a wireless communication with the second UE, and it is determined by the base station equipment that the communication mode is to be switched from the traditional cellular communication mode to the D2D communication mode in a case that the first UE is in the second scenario and the measurement report indicates that the quality of the D2D communication link between the first and second UEs is higher than the quality of the communication link between the first UE and the base station and that the quality of the D2D communication link between the first and second UEs is higher than the quality of a communication link between the first UE and the adjacent base station equipment.

Preferably, the method may further include: determining whether the first user equipment is in a third scenario in which a measured value of the quality of the D2D communication link between the first and second UEs is lower than a third predetermined threshold. If it is determined by the base station equipment that the first user equipment is in the third scenario, the base station equipment may set the configuration information and transmit the configuration information, to trigger a D2D communication link quality measurement between the first UE and a third UE among the plurality of UEs. It is determined by the base station equipment that the D2D communication mode between the first and second UEs is to be switched to a D2D communication mode between the first and third UEs in a case that the first UE is in the third scenario and the measurement report indicates that the quality of a D2D communication link between the first and third UEs is higher than the quality of the D2D communication link between the first and second UEs.

In the following, another wireless communication method in a wireless communication system is described. The method includes: receiving, by an electronic equipment in the wireless communication system, configuration information for a D2D communication measurement and switching information for indicating a switching of a communication object, transmitted by a base station equipment serving the electronic equipment, the configuration information containing information on a reference signal of a UE being a candidate object for a D2D communication of the electronic equipment; performing a configuration on the electronic equipment based on the configuration information, to perform a communication link quality measurement; receiving the reference signal of the UE based on the configuration, to perform a communication link quality measurement between the electronic equipment and the UE; transmitting a measurement report to the base station equipment based on the measurement result; and switching a communication object of the electronic equipment from a current communication object to the UE based on the switching information.

Preferably, the current communication object may be a base station equipment or another UE.

Preferably, the information on the reference signal of the UE may include information on physical resource carrying the reference signal.

Preferably, the configuration information may be contained in Radio Resource Control (RRC) singling to be transmitted to the electronic device.

Preferably, the reference signal may be at least one of a Sounding Reference Signal (SRS) and a Demodulation Reference Signal (DMRS).

Preferably, the electronic device may further measure the qualities of links corresponding to other communication objects, compare the measurement results, and transmit a measurement report based on the comparison result.

In the following, another wireless communication method in a wireless communication system is described. The method includes: receiving, by an electronic equipment in the wireless communication system, configuration information on physical resource of a D2D reference signal for a D2D measurement from a base station equipment serving the electronic equipment; performing a D2D reference signal transmission configuration on the electronic equipment based on the configuration information; and transmitting the D2D reference signal based on the configuration, with the D2D reference signal including at least one of a Sounding Reference Signal (SRS) and a Demodulation Reference Signal (DMRS).

Implements of the above steps of the wireless communication methods in the wireless communication system according to the embodiments of the present disclosure are described in detail in the above, and are not described repeatedly hereinafter.

An electronic device is further provided according to an embodiment of the present disclosure. The electronic device includes a processing circuit configured to perform the following operations: setting, by the electronic equipment in the wireless communication system, for a first UE served by the electronic equipment, configuration information for a D2D communication measurement, the configuration information containing information on a reference signal of a second UE being a candidate object for a D2D communication of the first user equipment; transmitting the configuration information, to trigger a communication link quality measurement between the first and second UEs; receiving a measurement report from the first UE; determining, based on the measurement report, whether a communication object of the first UE is to be switched from a current communication object to the second UE; and transmitting switching information to notify the first and second UEs to communicate with each other, if it is determined that the communication object of the first UE is to be switched from the current communication object to the second UE.

An electronic device is further provided according to an embodiment of the present disclosure. The electronic device includes a processing circuit configured to perform the following operations: receiving, by the electronic equipment in the wireless communication system, configuration information for a D2D communication measurement and switching information for indicating a switching of a communication object, transmitted by a base station equipment serving the electronic equipment, the configuration information containing information on a reference signal of a UE being a candidate object for a D2D communication of the electronic equipment; performing a configuration on the electronic equipment based on the configuration information, to perform a communication link quality measurement; receiving the reference signal of the UE based on the configuration, to perform a communication link quality measurement between the electronic equipment and the UE; transmitting a measurement report to the base station equipment based on the measurement result; and switching a communication object of the electronic equipment from a current communication object to the UE based on the switching information.

An electronic device is further provided according to an embodiment of the present disclosure. The electronic device includes a processing circuit configured to perform the following operations: receiving, by the electronic equipment in the wireless communication system, configuration information on physical resource of a D2D reference signal for a D2D measurement from a base station equipment serving the electronic equipment; performing a D2D reference signal transmission configuration on the electronic equipment based on the configuration information; and transmitting the D2D reference signal based on the configuration, with the D2D reference signal including at least one of a Sounding Reference Signal (SRS) and a Demodulation Reference Signal (DMRS).

It should be understood that, the above electronic equipment may perform other technical solutions of the present disclosure describe in the above, which is not described herein for simplification.

Apparently, operation processes of the wireless communication methods in the wireless communication system according to the present disclosure may be implemented in a form of a computer executable program stored in various machine readable storage mediums In addition, the present disclosure can be implemented by supplying a memory medium, in which the above executable program codes are stored, directly or indirectly to a system or apparatus. And a computer or central processing unit (CPU) of the system or apparatus reads and executes the above program codes. In this case, as long as the system or apparatus has a program executing function, embodiments of the present disclosure are not limited to a program, and the program may have any other forms, such as a target program, an interpreter executable program or a script program for an operation system.

The above machine readable memory mediums include but are not limited to various memories and memory units, semiconductor apparatuses, disk units such as an optical disk, a magnetic disk and a magneto-optical disk, and other mediums adapted to store information.

Besides, the computer downloads the computer program according to the present disclosure by connecting to a website on the Internet, installs the computer program therein and then executes the program, thereby achieving the technical solutions of the present disclosure.

Figure 14:
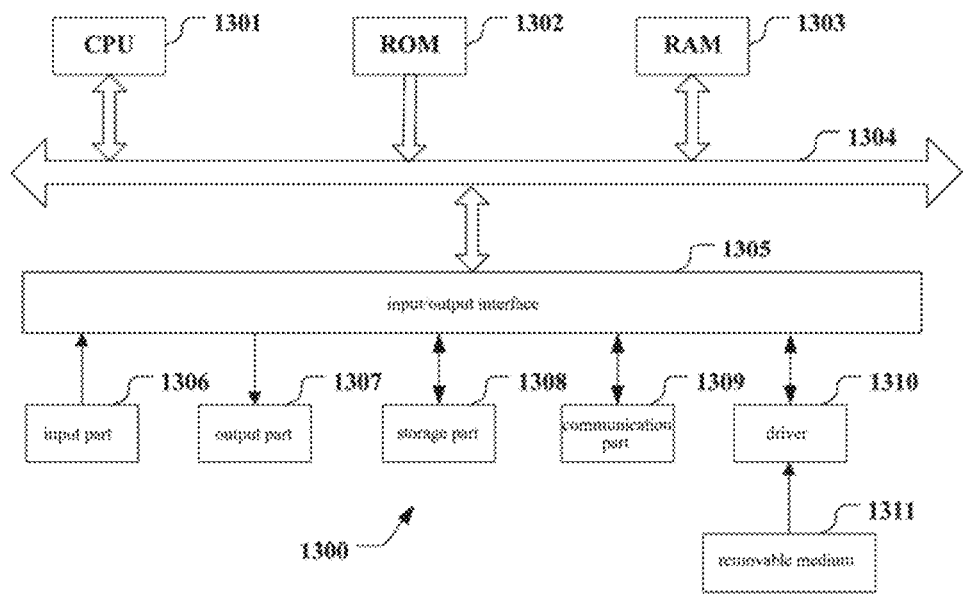
FIG. 14 is a block diagram of an exemplary structure of a general-purpose personal computer in which a communication mode switching method in a wireless communication system according to an embodiment of the present disclosure can be implemented.

FIG. 14 is a block diagram of an exemplary structure of a general-purpose personal computer in which a communication mode switching method in a wireless communication system according to an embodiment of the present disclosure can be implemented.

As illustrated in FIG. 14, a CPU 1301 performs various processes based on a program stored in a Read-Only Memory (ROM) 1302 or a program loaded from a storage part 1308 to a Random Access Memory (RAM) 1303. Data needed, for example, in the various processes performed by the CPU 1301, may be also stored in the RAM 1303 as needed. The CPU 1301, the ROM 1302 and the RAM 1303 are connected to one another via a bus 1304. And an input/output interface 1305 is also connected to the bus 1304.

Components connected to the input/output interface 1305 include: an input part 1306 (such as a keyboard and a mouse), an output part 1307 (including a speaker, and a display such as a Cathode-Ray Tube (CRT) and a Liquid crystal display (LCD)), a storage part 1308 (such as a hard disk) and a communication part 1309 (including a network interface card such as a LAN card and a modem). The communication part 1309 performs a communication processing via a network such as the Internet. A driver 1310 may be further connected to the input/output interface 1305 as needed. A removable medium 1311 such as a magnetic disk, an optical disk, a magneto-optical disk and a semiconductor memory are mounted on the driver 1310 as needed, and hence a computer program read from the removable medium 1311 is installed in the storage part 1309 as needed.

In a case that the above processes are implemented with software, programs composing the software are installed from a network such as the Internet or from a memory medium such as the removable medium 1311.

It should be understood by those skilled in the art that, the memory medium is not limited to the removable medium 1311 illustrated in FIG. 14 in which programs are stored in and which is distributed separately with the apparatus to provide a program to a user. An example of the removable medium 1311 includes a magnetic disk (including floppy disk (registered trademark)), an optical disk (including a Compact Disk Read Only Memory (CD-ROM) and a digital versatile disk (DVD)), a magneto-optical disk (including a MiniDisk (MD) (registered trademark)) and a semiconductor memory. Or, the memory medium may be the ROM 1302, a hard disk contained in the storage part 1308 and the like, in which programs are stored. And the memory medium is distributed to a user together with the apparatus containing the memory medium.

As described in the above, a measuring and deciding technical solution in a transmission mode switching mechanism is provided according to the present disclosure. A base station configures a communication UE and triggers the UE to perform a measurement, by detecting a scenario that the UE is in. If the measurement result meets a measurement event of a D2D dedicated configuration, the UE reports to the base station. The base station executes, based on the D2D measurement event and the communication scenario that the UE is in, a transmission mode switching decision based on the communication scenario.

Based on the design disclosed above, it can be ensured that a communication mode switching decision made by the base station in a special scenario is effective and targeted. Hence an effective D2D communication can be performed and maintained between UEs.

In the system and method according to the present disclosure, apparently, the components and steps may be decomposed and/or recombined. These decompositions and/or recombinations should be considered as equivalent solutions of the present disclosure. Moreover, steps performing the above series of processes may be performed naturally in a describing order and in a time order and do not need to be performed in a specified order. Some steps may be performed in parallel or performed separately.

In the above, the embodiments of the present disclosure are described in detail in conjunction with the drawings. And it should be understood that, the embodiments described in the above are only used to explain the present disclosure, and are not intended to limit the present disclosure. The above embodiments can be changed and modified by those skilled in the art without departing from the spirit and scope of the present disclosure. Therefore, the scope of the present disclosure is defined by the appended claims and their equivalents.

The invention claimed is:

1. An electronic equipment in a wireless communication system, comprising:
   processing circuitry configured to:
   set, for a first user equipment served by the electronic equipment, information on a reference signal of a second user equipment being a candidate object for a Device-to-Device (D2D) communication of the first user equipment;
   receive a measurement report from the first user equipment;
   transmit switching information to notify the first and second user equipments to communicate with each other, when a communication object of the first user equipment is determined to be switched from a current communication object to the second user equipment based on the measurement report and information on a relative velocity between the first and second user equipment;
   determine that the first user equipment is in a scenario in which a measured value of a D2D communication link quality between the first and second user equipments is lower than a threshold;
   trigger a D2D communication link quality measurement between the first user equipment and a third user equipment among a plurality of user equipments;
   determine to switch a D2D communication mode between the first and second user equipments to a D2D communication mode between the first and third user equipments based on the D2D communication link quality measurement between the first user equipment and the third user equipment;
   determine whether the first user equipment is in a first scenario in which a system gain is improved when a D2D communication is performed between the first and second user equipments; and
   initiate the setting of the configuration information when the first user equipment is in the first scenario,
   wherein the communication mode is to be switched from a traditional cellular communication mode to the D2D communication mode when the first user equipment is in the first scenario and the measurement report indicates that a measured value of the quality of a D2D communication link between the first and second user equipments is greater than a first predetermined threshold.

2. The electronic equipment according to claim 1, wherein the current communication object is a base station equipment or another user equipment.

3. The electronic equipment according to claim 1, wherein the information on the reference signal of the second user equipment comprises information on physical resource carrying the reference signal.

4. The electronic equipment according to claim 3, wherein the processing circuitry is further configured to transmit configuration information for indicating the physical resource utilized by the second user equipment to transmit the reference signal.

5. The electronic equipment according to claim 1, wherein the processing circuitry is further configured to:
   set configuration information for the D2D communication measurement that includes the information on the reference signal of the second user equipment;
   transmit the configuration information, to trigger a D2D communication link quality measurement between the first and second user equipments; and
   determine, based on the measurement report and information on a user equipment moving state, whether the current communication object of the first user equipment is to be switched to the second user equipment, the information on the user equipment moving state including the information on a relative velocity between the first and second user equipment.

6. The electronic equipment according to claim 5, wherein the processing circuitry is further configured to cause the configuration information to be contained in Radio Resource Control (RRC) signaling to transmit the configuration information to the first user equipment.

7. The electronic equipment according to claim 5, wherein the reference signal is at least one of a Sounding Reference Signal (SRS) and a Demodulation Reference Signal (DMRS).

8. The electronic equipment according to claim 1, wherein the processing circuitry is further configured to determine whether the first user equipment is in the first scenario based on at least one of information on the user equipment moving state, information on user equipment service requirement, information on adjacent cell deployment density, and information on source cell load degree.

9. The electronic equipment according to claim 8, wherein the first user equipment is in the first scenario when any of the following conditions is met:
   the information on user equipment moving state indicates that the relative velocity between the first and second user equipments is low and an absolute velocity between the first user equipment and the electronic equipment is high;
   the information on user equipment moving state indicates that the absolute velocity between the first user equipment and the electronic equipment is moderate, and the information on adjacent cell deployment density indicates that an adjacent cell deployment density is high;
   the information on user equipment service requirement indicates that a user equipment service requirement is a continuous large data size; and
   the information on user equipment service requirement indicates that the user equipment service requirement is a continuous moderate data size, and the information on source cell load degree indicates that a source cell load degree is high.

10. The electronic equipment according to claim 5, wherein the processing circuitry is further configured to
   determine whether the first user equipment is in a second scenario in which a measured value of the quality of a communication link between the first user equipment and the electronic equipment is less than a second predetermined threshold,
   wherein, when the first user equipment is in the second scenario, the processing circuitry is further configured to set the configuration information, and transmit the configuration information, to trigger the communication link quality measurement between the first and second user equipments.

11. The electronic equipment according to claim 10, wherein the electronic equipment performs a wireless communication with the second user equipment, and
   it is determined that the communication mode is to be switched from the traditional cellular communication mode to the D2D communication mode in a case that the first user equipment is in the second scenario and the measurement report indicates that the quality of the D2D communication link between the first and second user equipments is higher than the quality of the communication link between the first user equipment and the electronic equipment.

12. The electronic equipment according to claim 10, wherein an adjacent electronic equipment adjacent to the electronic equipment performs a wireless communication with the second user equipment, and
   it is determined that the communication mode is to be switched from the traditional cellular communication mode to the D2D communication mode in a case that the first user equipment is in the second scenario and the measurement report indicates that the quality of the D2D communication link between the first and second user equipments is higher than the quality of the communication link between the first user equipment and the electronic equipment and that the quality of the D2D communication link between the first and second user equipments is higher than the quality of a communication link between the first user equipment and the adjacent electronic equipment.

13. An electronic equipment in a wireless communication system, comprising processing circuitry configured to:
   receive information on a reference signal of a user equipment being a candidate object for a Device-to-Device (D2D) communication of the electronic equipment;
   transmit a measurement report to the base station equipment based on quality of a D2D communication link between the electronic equipment and the user equipment based on the referenced signal of the user equipment; and
   switch a communication between the electronic equipment and a current communication object to a communication between the electronic equipment and the user equipment based on switching information, wherein the base station equipment (i) transmits the switching information, (ii) determines to switch the communication between the electronic equipment and the user equipment to a D2D communication between the electronic equipment and another user equipment based on the D2D communication link quality measurement and a relative velocity between the electronic equipment and the another user equipment, and (iii) determines whether the electronic equipment is in a first scenario in which a system gain is improved when a D2D communication is performed between the electronic equipment and the user equipment,
   wherein the communication mode is to be switched from the traditional cellular communication mode to the D2D communication mode when the electronic equipment is in the first scenario and the measurement report indicates that a measured value of the quality of a D2D communication link between the electronic equipment and the user equipment is greater than a first predetermined threshold.

14. The electronic equipment according to claim 13, wherein the current communication object is the base station equipment or another user equipment.

15. The electronic equipment according to claim 13, wherein the information on the reference signal of the user equipment comprises information on physical resource carrying the reference signal.

16. The electronic equipment according to claim 13, wherein the configuration information is contained in Radio Resource Control (RRC) signaling to transmit the configuration information to the user equipment.

17. The electronic equipment according to claim 13, wherein the reference signal is at least one of a Sounding Reference Signal (SRS) and a Demodulation Reference Signal (DMRS).

18. The electronic equipment according to claim 13, wherein:
the processing circuitry is further configured to
receive configuration information for D2D communication measurement that includes the information on the reference signal and the switching information,
perform a configuration on the electronic equipment based on the configuration information, to perform a communication link quality measurement,
perform a measurement on the quality of a communication link between the electronic equipment and the user equipment based on the configuration and reference signal of the user equipment, and
transmit the measurement report based on the quality of the D2D communication link indicated by a result of the measurement, and wherein the base station equipment determines that the electronic equipment is in a scenario in which a measured value of a D2D communication link quality between the electronic equipment and the user equipment is lower than a threshold, sets the configuration information, and transmits the switching information to trigger a measurement of the quality of the D2D communication link between the electronic equipment and another user equipment among a plurality of equipment.

19. An electronic equipment in a wireless communication system, comprising
processing circuitry configured to:
receive configuration information on physical resource of a Device-to-Device (D2D) reference signal for a D2D measurement, from a base station equipment serving the electronic equipment:
and
transmit the D2D reference signal comprising at least one of a Sounding Reference Signal (SRS) and a Demodulation Reference Signal (DMRS);
establish a communication with a user equipment, which switches a previous communication between the user equipment and the base station equipment to the communication between the user equipment and the electronic equipment, wherein the base station equipment (i) determines that the user equipment is in a scenario in which a measured value of a D2D communication link quality between the electronic equipment and the user equipment is lower than a threshold, (ii) sets the configuration information, (iii) transmits the configuration information, (iv) determines to switch the communication between the user equipment and the electronic equipment to a D2D communication between the user equipment and the another user equipment based on a D2D communication link quality measurement and a relative velocity between the user equipment and the another user equipment, (v) determines whether the user equipment is in a first scenario in which a system gain is improved when a D2D communication is performed between the electronic equipment and the user equipment, and (vi) initiates the setting of the configuration information when the user equipment is in the first scenario,
wherein the communication mode is to be switched from the traditional cellular communication mode to the D2D communication mode when the user equipment is in the first scenario and the measurement report indicates that a measured value of the quality of a D2D communication link between the electronic equipment and the user equipment is greater than a first predetermined threshold.

20. The electronic equipment according to claim 19, wherein the processing circuitry is further configured to perform a D2D reference signal transmission configuration on the electronic equipment based on the configuration information, and transmit the D2D reference signal based on the configuration, and
the base station transmits the configuration information to trigger the D2D communication link quality measurement.

* * * * *